(12) United States Patent
Taki

(10) Patent No.: US 8,867,143 B2
(45) Date of Patent: Oct. 21, 2014

(54) ZOOM LENS AND IMAGE PICKUP APPARATUS INCLUDING THE SAME

(71) Applicant: Canon Kabushiki Kaisha, Tokyo (JP)

(72) Inventor: Yoshiyuki Taki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/676,301

(22) Filed: Nov. 14, 2012

(65) Prior Publication Data

US 2013/0120640 A1 May 16, 2013

(30) Foreign Application Priority Data

Nov. 16, 2011 (JP) ................................. 2011-250498
Nov. 17, 2011 (JP) ................................. 2011-251498

(51) Int. Cl.
*G02B 15/14* (2006.01)
*H04N 5/225* (2006.01)
*G02B 15/16* (2006.01)
*G02B 15/20* (2006.01)

(52) U.S. Cl.
CPC ................ *G02B 15/14* (2013.01); *G02B 15/16* (2013.01); *H04N 5/225* (2013.01); *G02B 15/20* (2013.01)
USPC .......................................... 359/684; 348/340

(58) Field of Classification Search
CPC ........ G02B 15/14; G02B 15/16; G02B 15/20; H04N 5/225
USPC .......... 359/676, 683, 684, 685, 691; 348/340, 348/345
See application file for complete search history.

(56) References Cited

U.S. PATENT DOCUMENTS 5,701,204 A   12/1997  Matsumoto
2002/0041451 A1*  4/2002  Harada .......................... 359/745

FOREIGN PATENT DOCUMENTS

| CN | 101017237 A | 8/2007 |
| CN | 101034202 A | 9/2007 |
| CN | 101086551 A | 12/2007 |
| JP | 61-236516 A | 10/1986 |
| JP | 62-153914 A | 7/1987 |
| JP | 11-258506 A | 9/1999 |

* cited by examiner

*Primary Examiner* — David N Spector
(74) *Attorney, Agent, or Firm* — Canon USA Inc. IP Division

(57) ABSTRACT

A zoom lens includes a negative lens unit having a negative refractive power and a positive lens unit having a positive refractive power arranged in order from an object side to an image side. For focusing from infinity to a closest distance, the negative lens unit moves towards the image side and the positive lens unit moves towards the object side. Predetermined mathematical conditions are satisfied to obtain high optical performance over the entire focusing range.

15 Claims, 41 Drawing Sheets

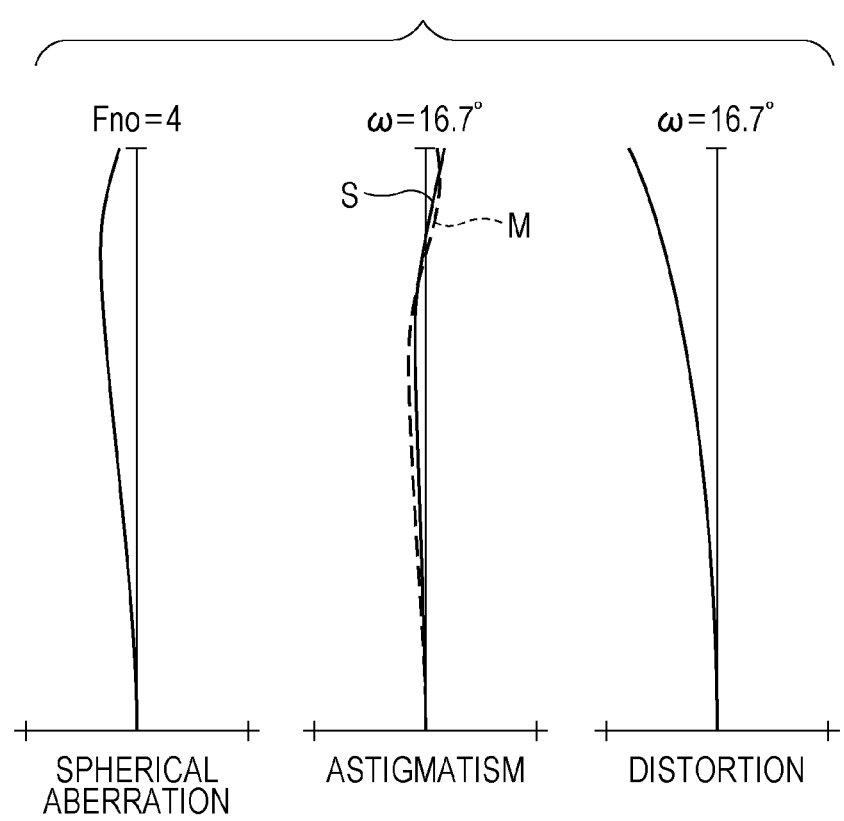

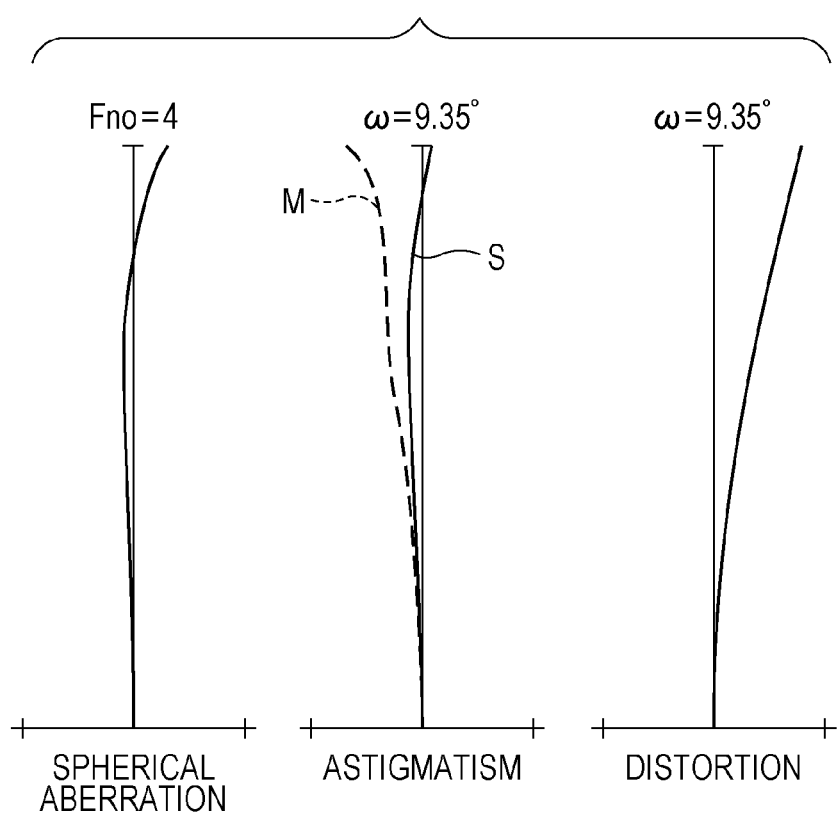

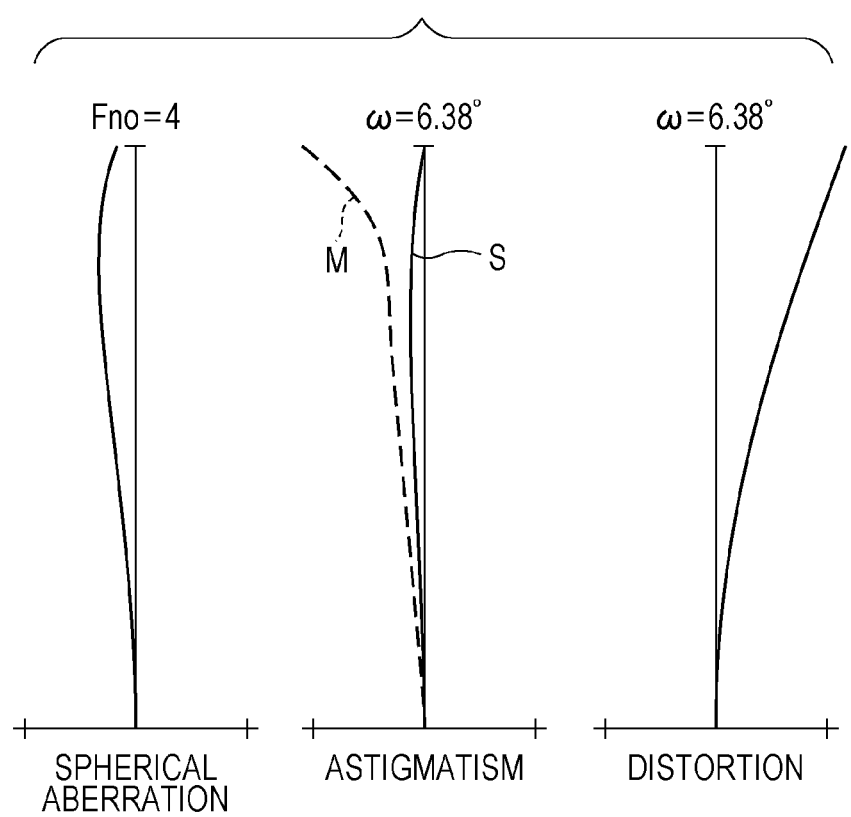

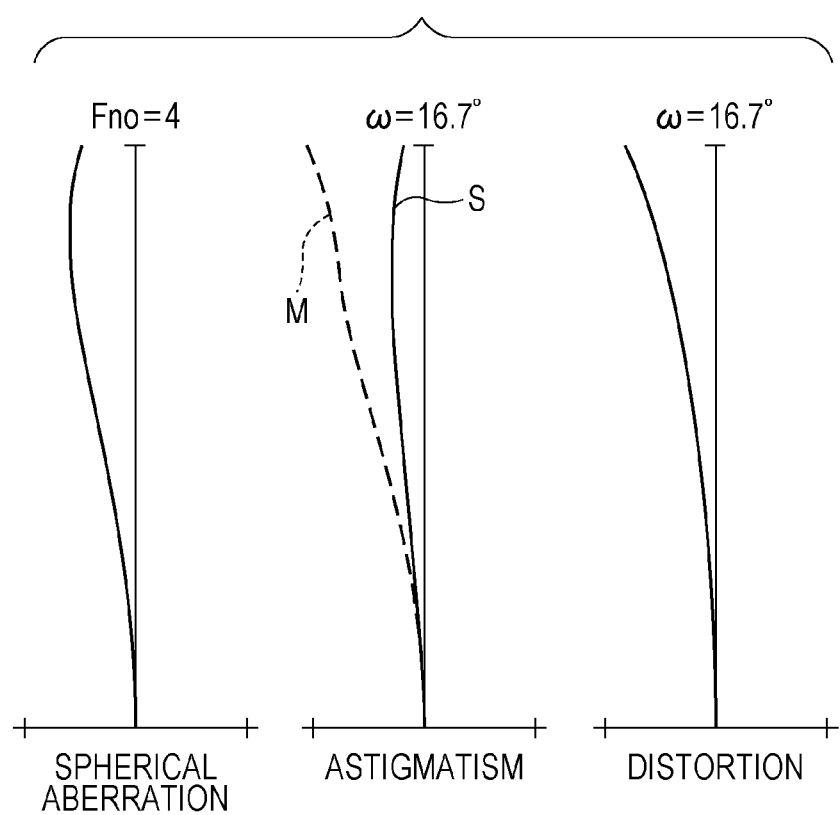

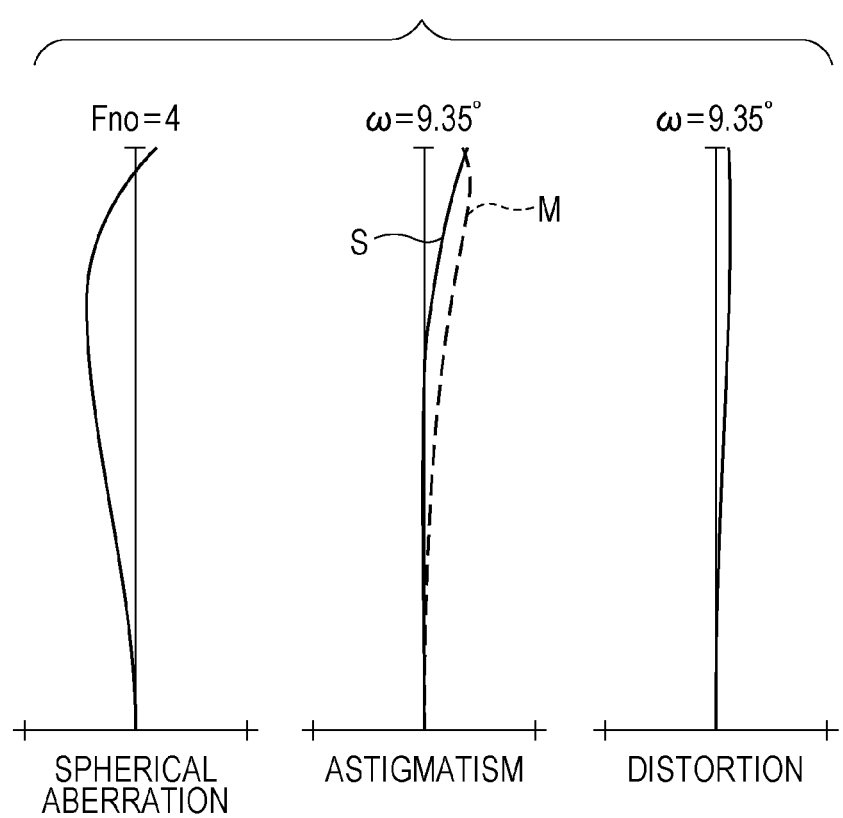

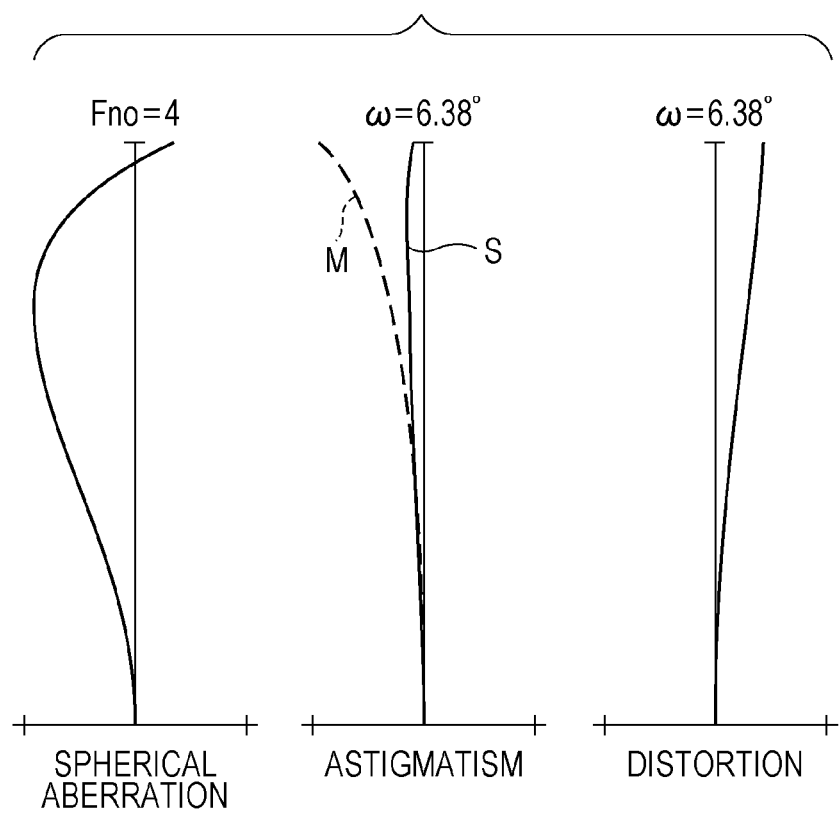

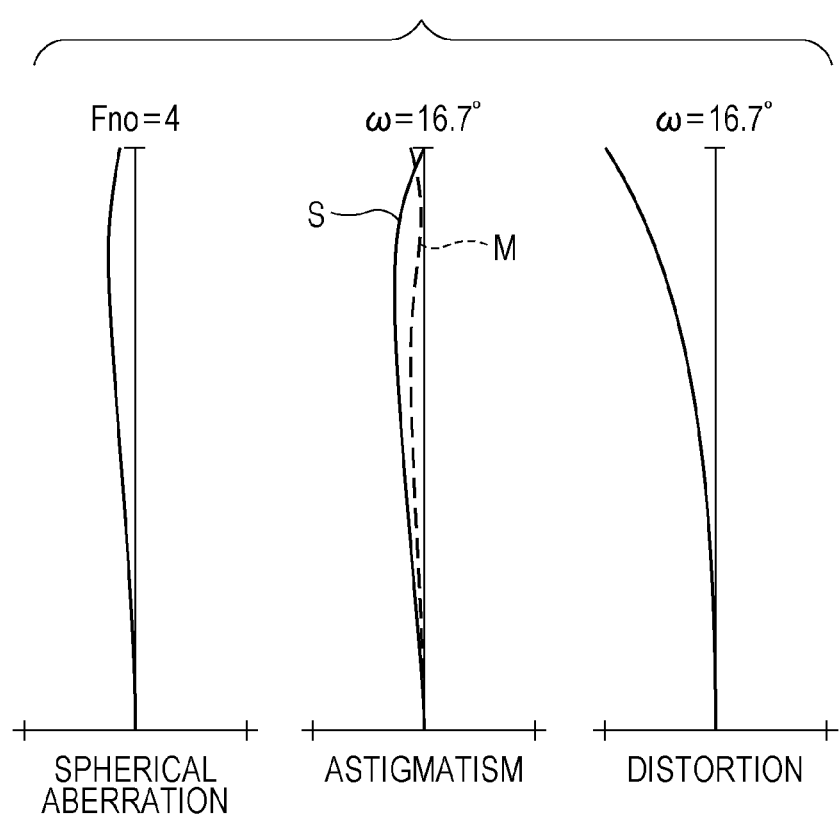

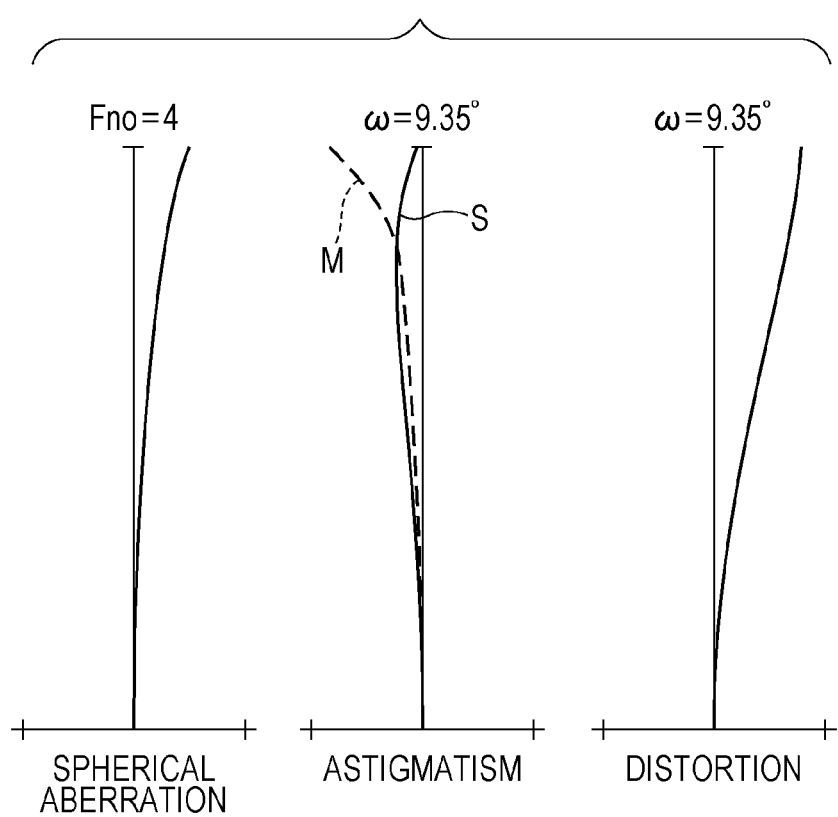

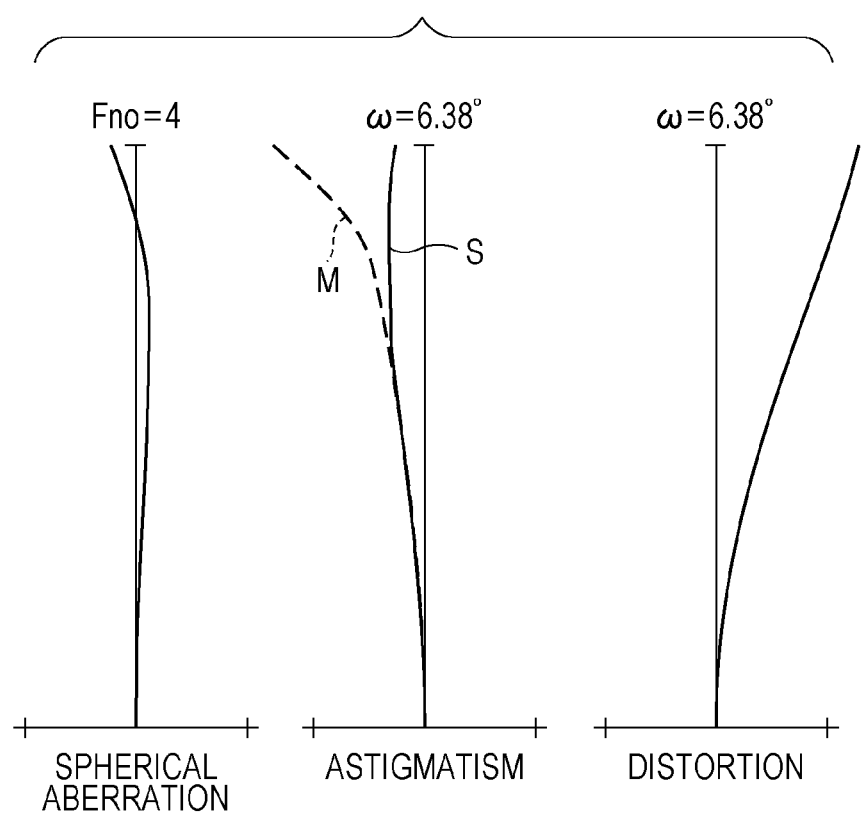

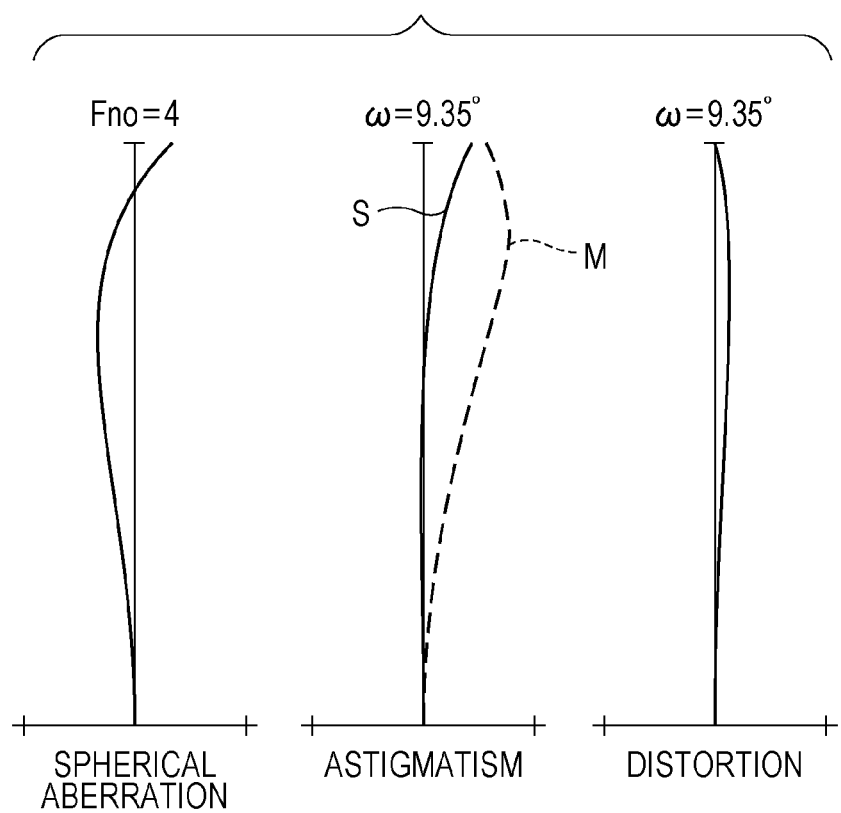

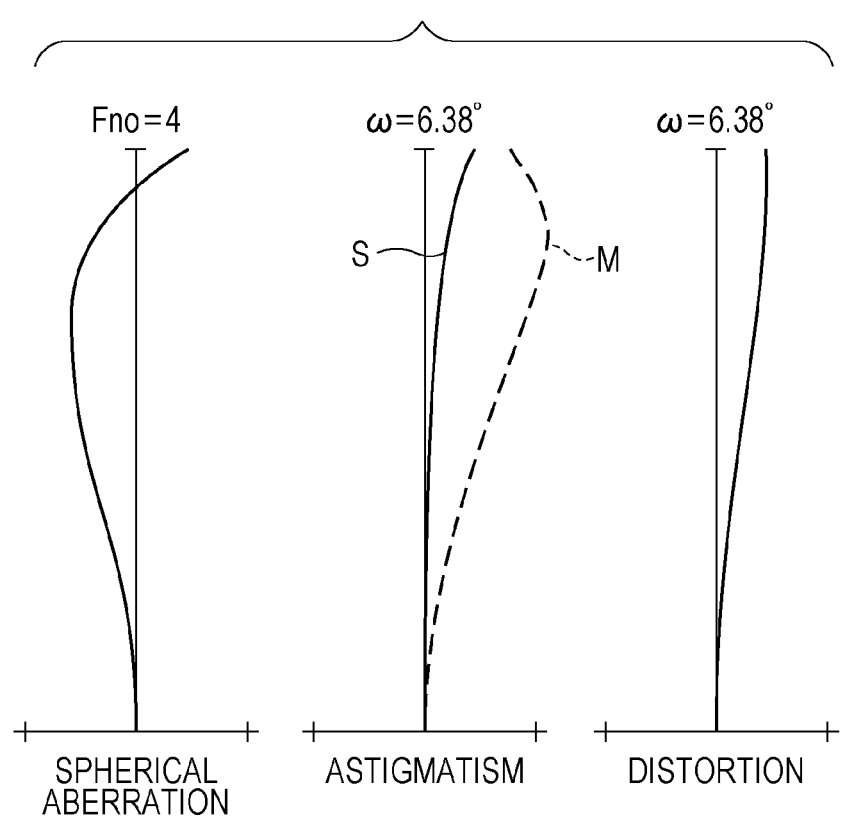

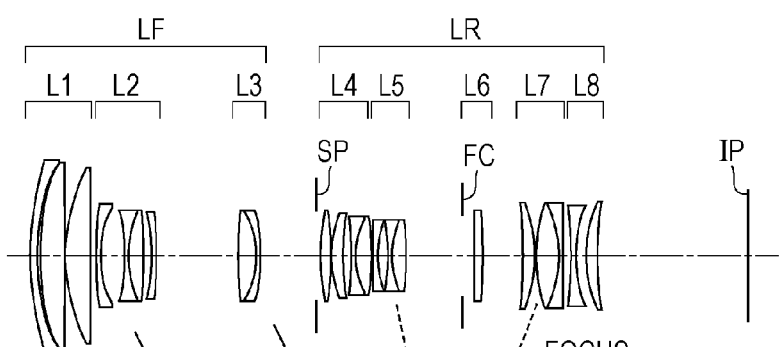
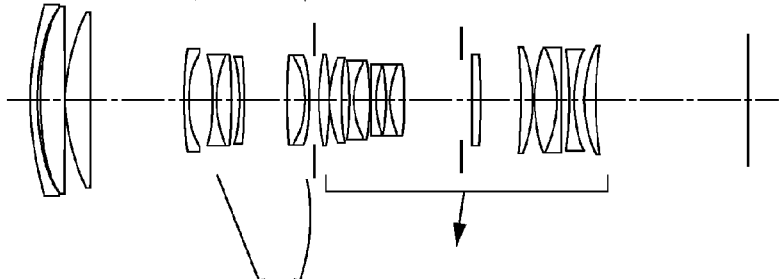
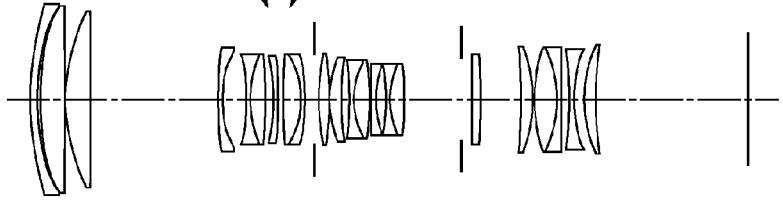
FIG. 9A
FIG. 9B
FIG. 9C

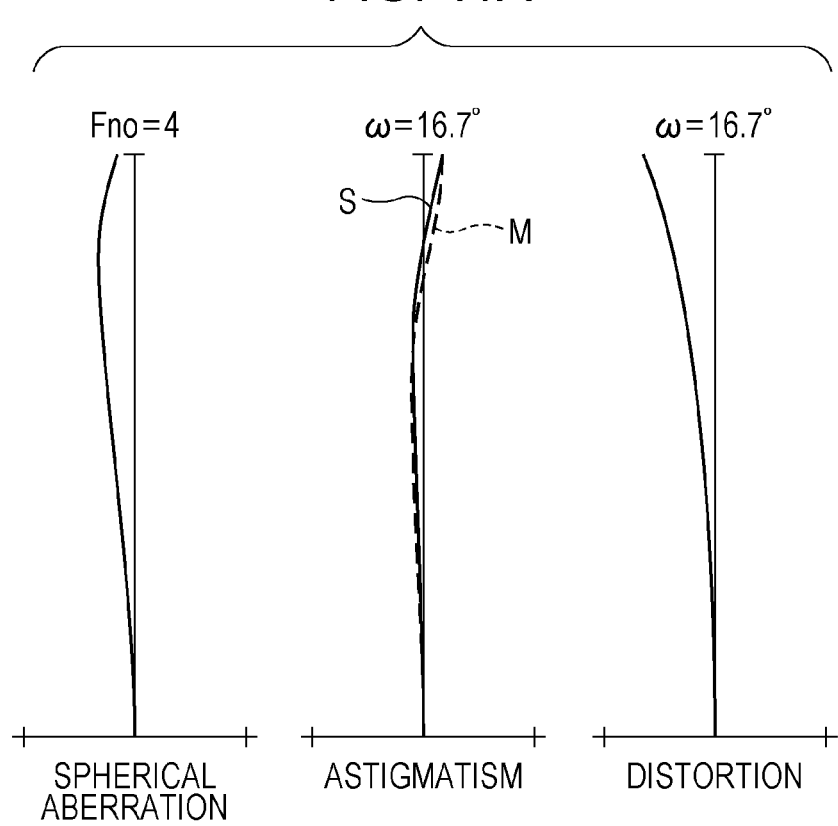

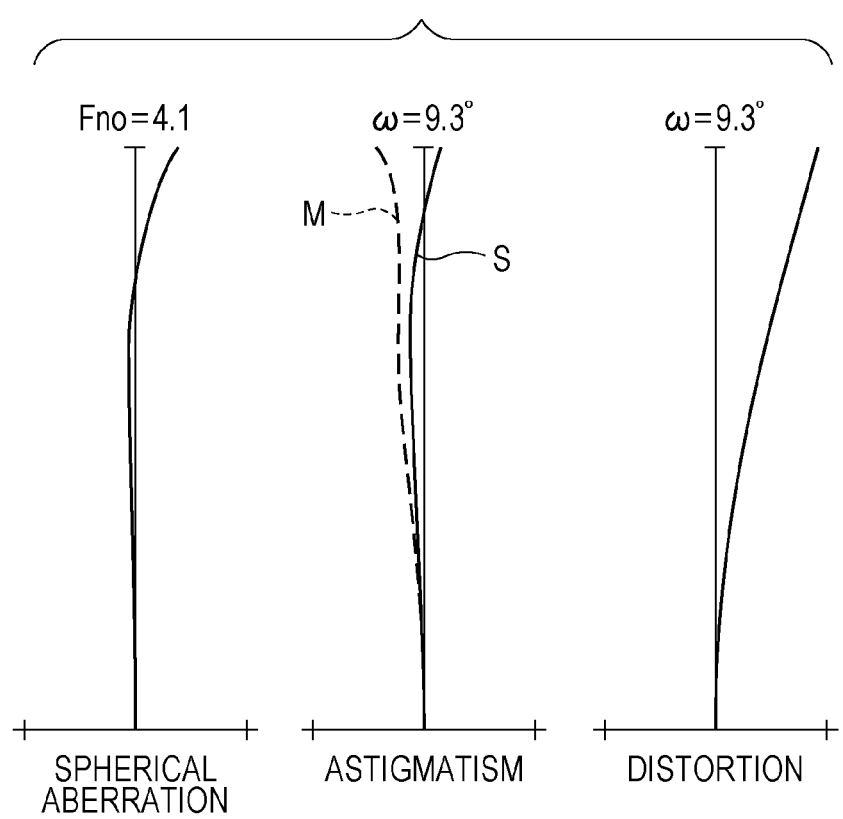

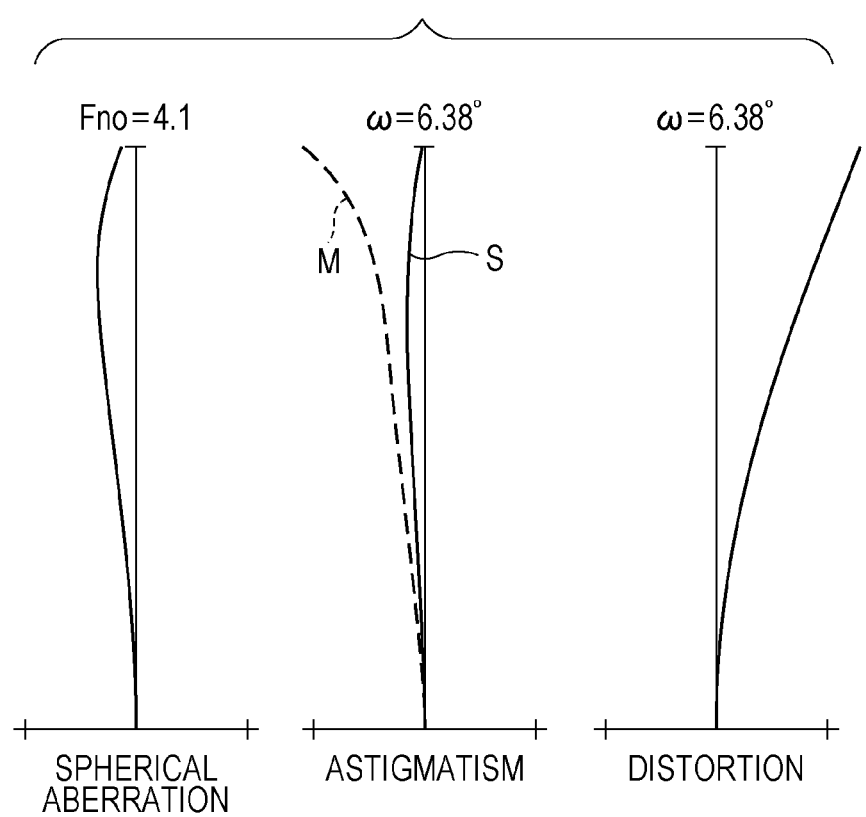

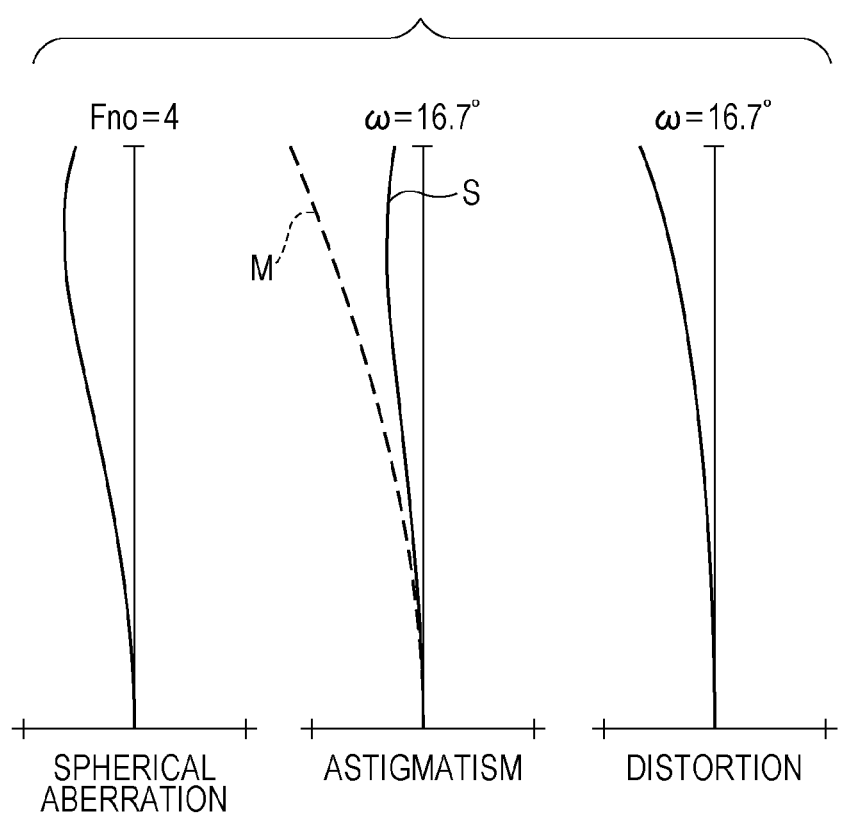

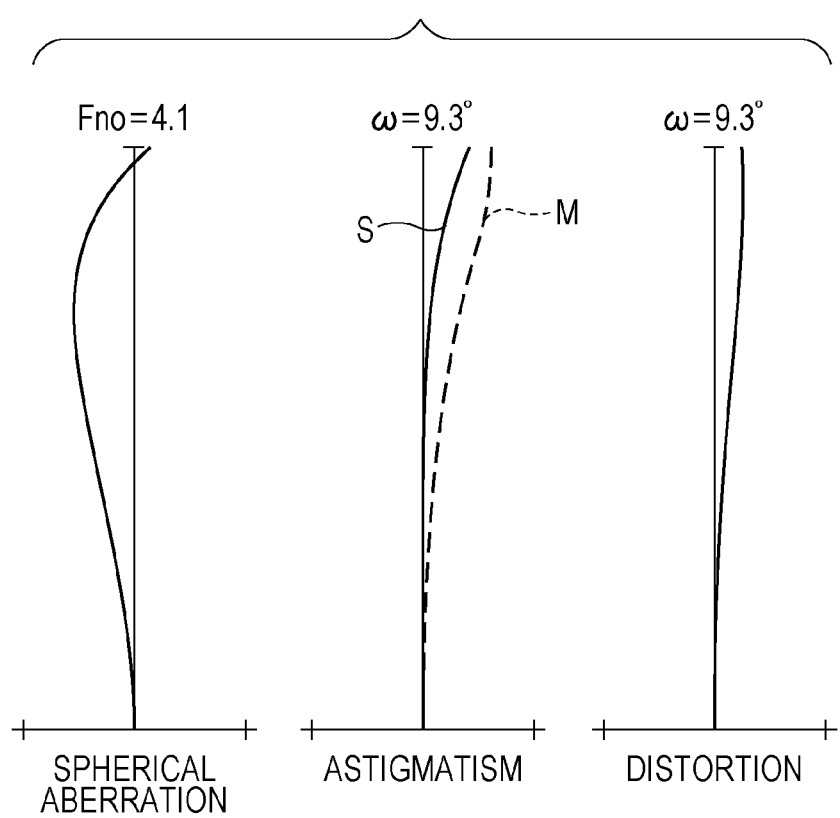

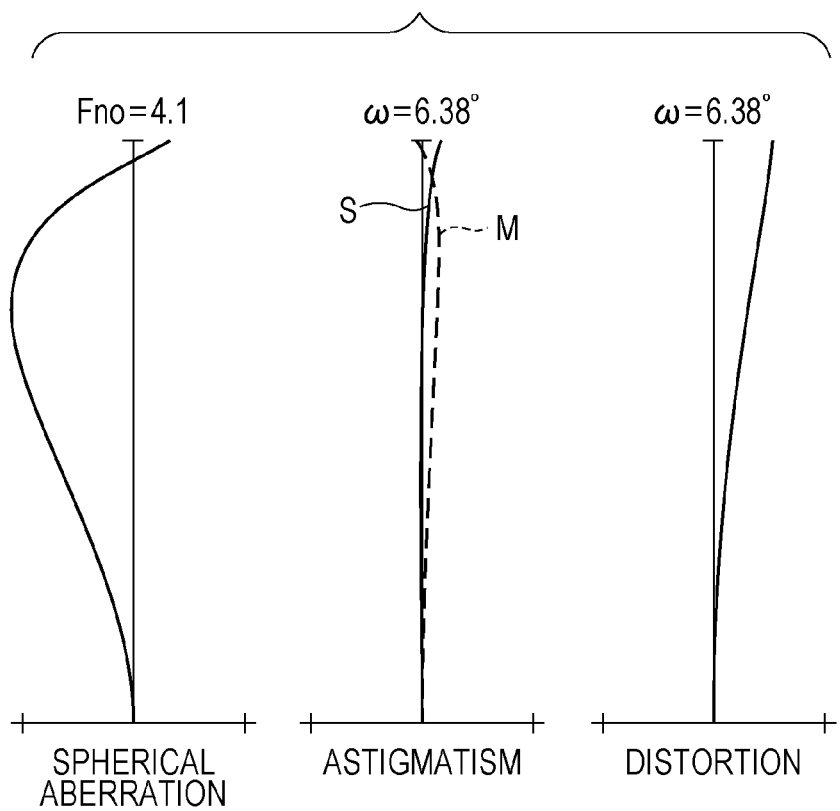

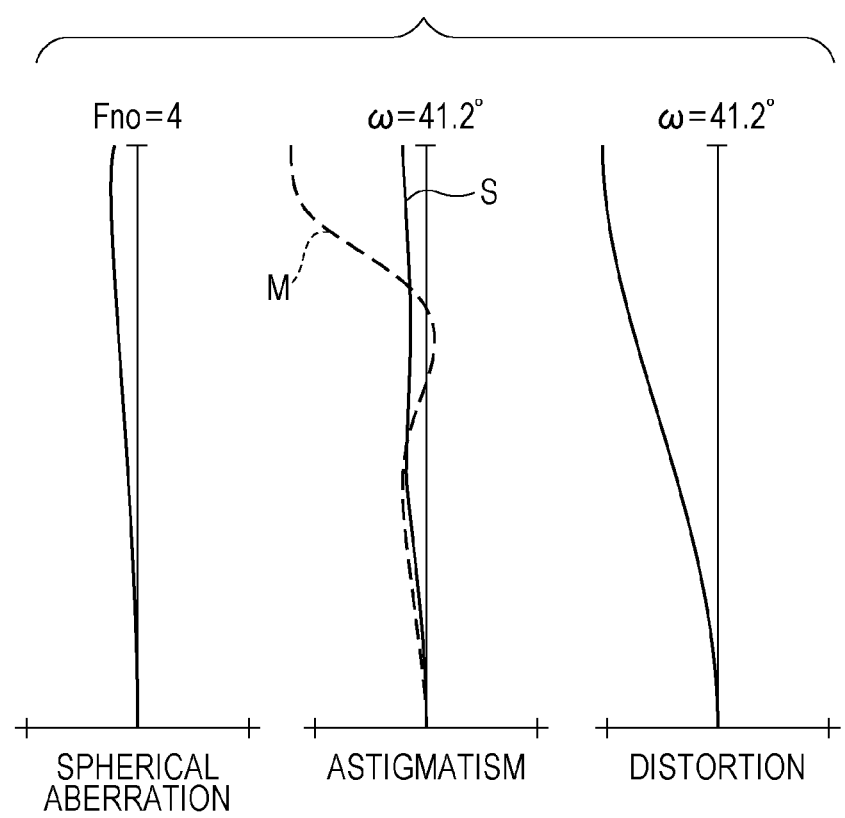

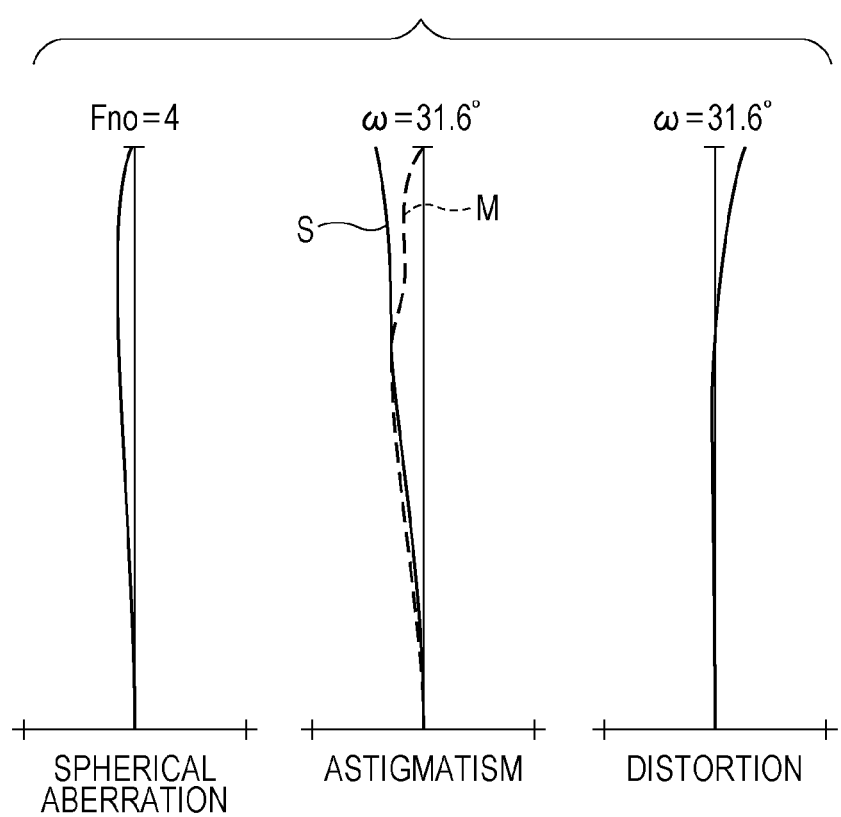

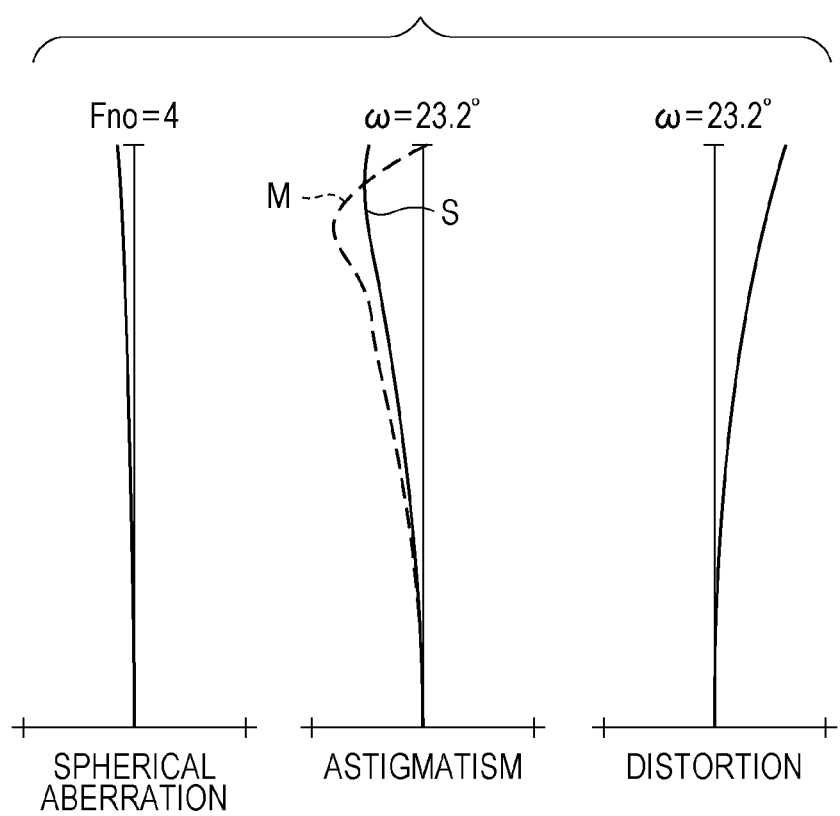

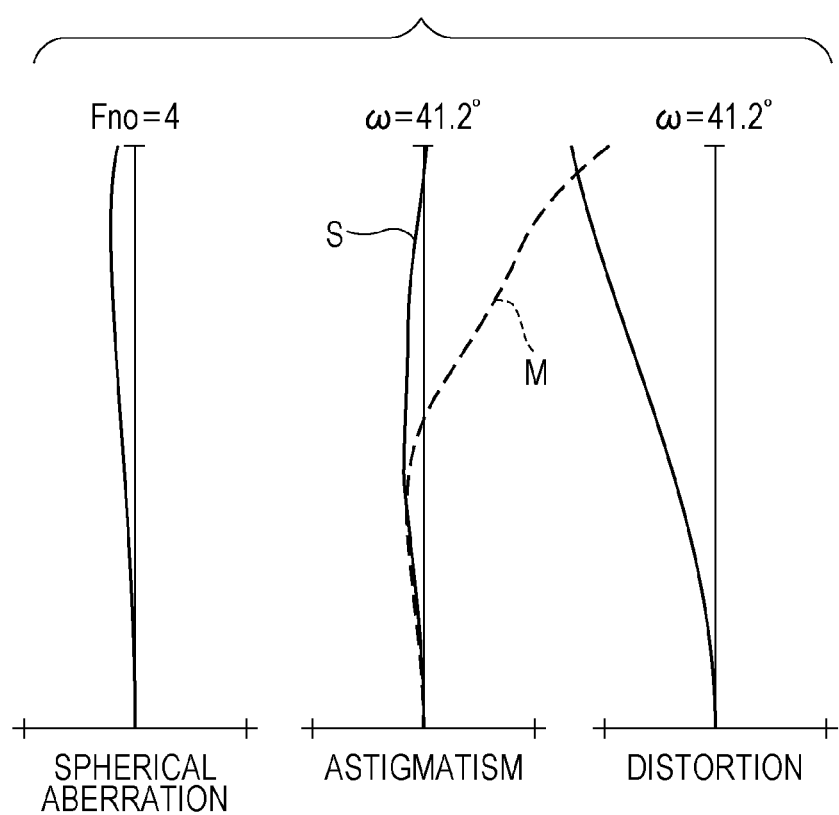

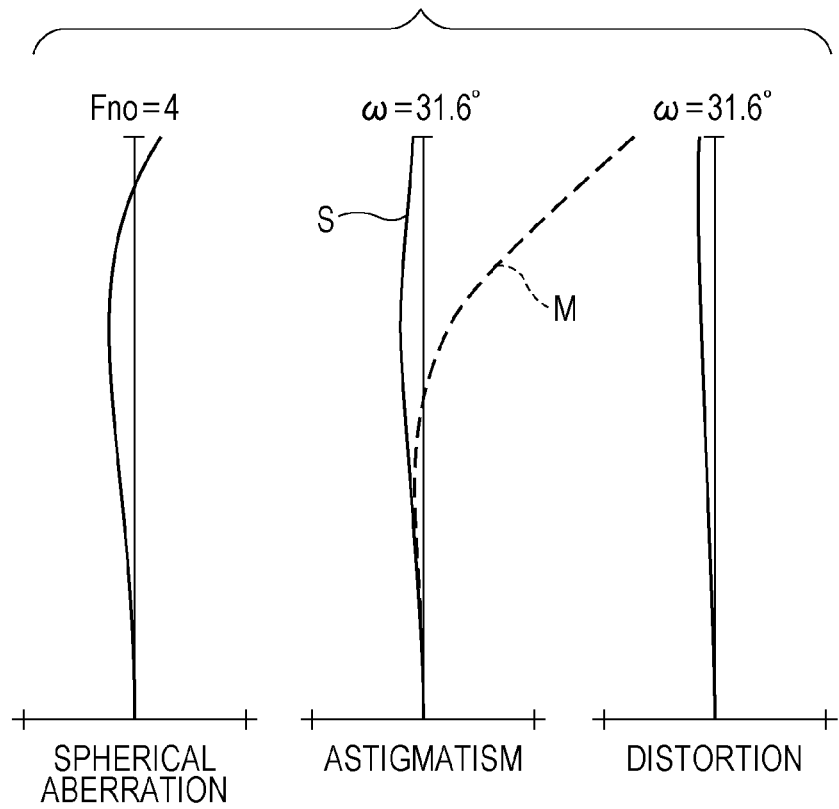

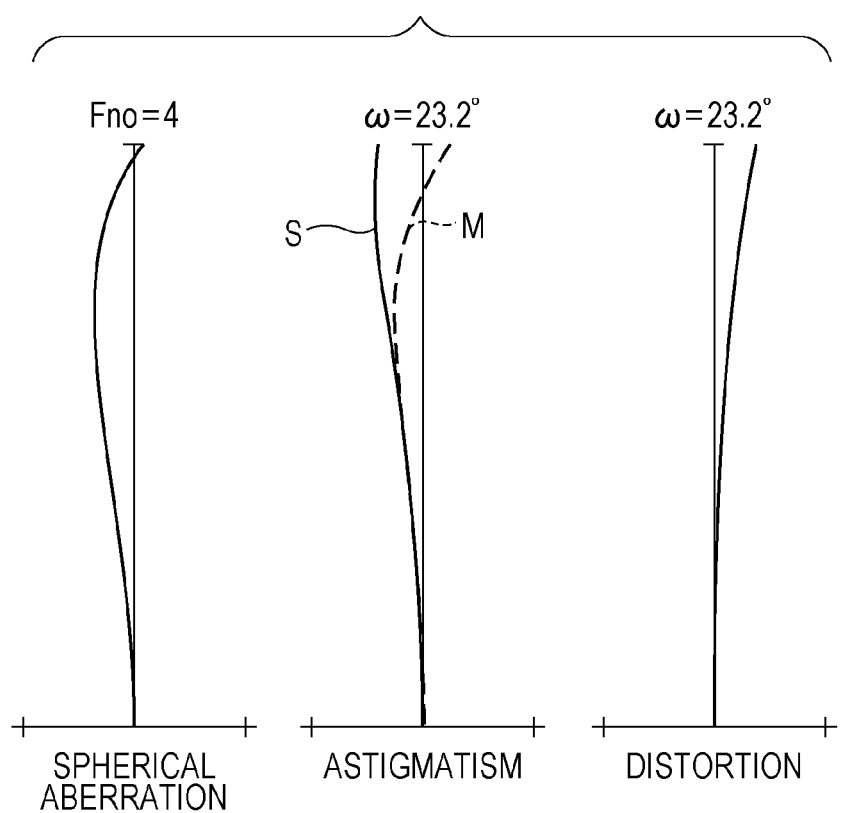

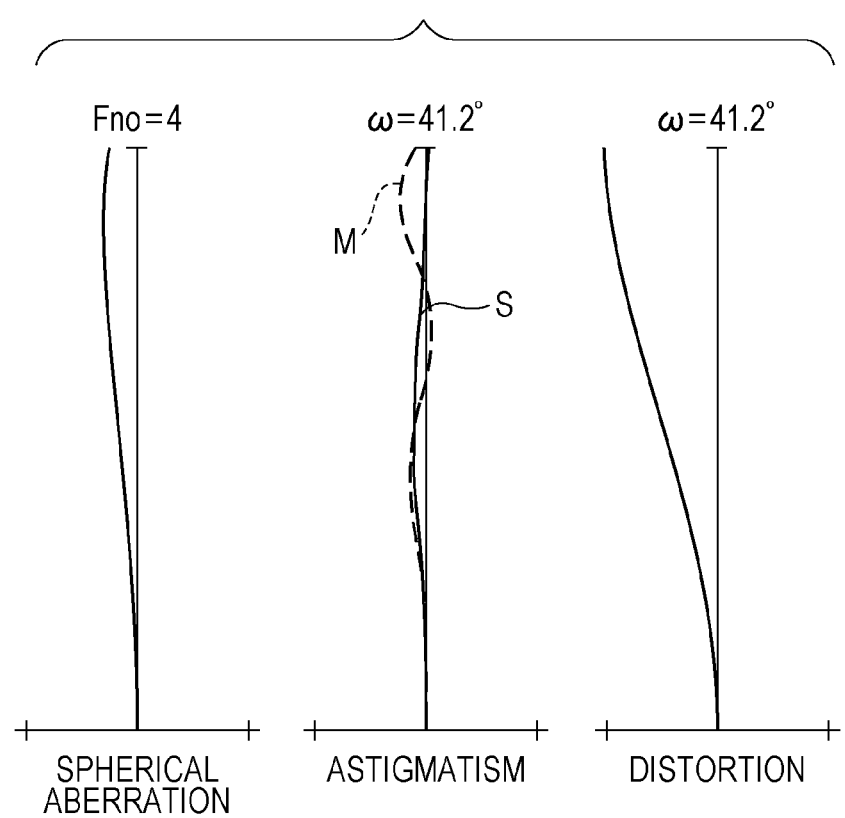

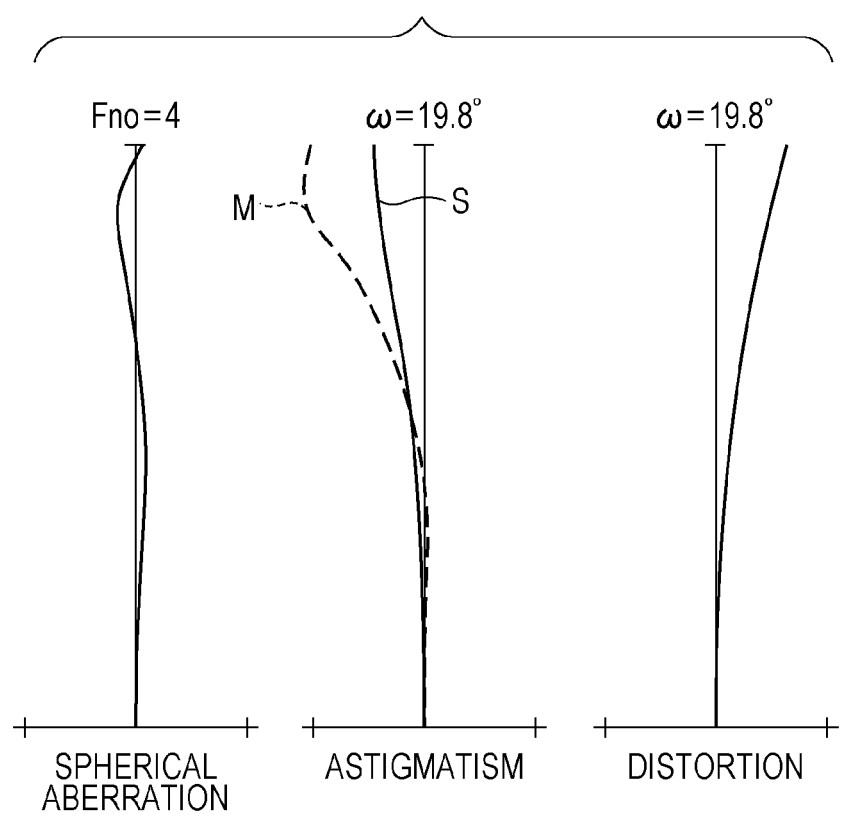

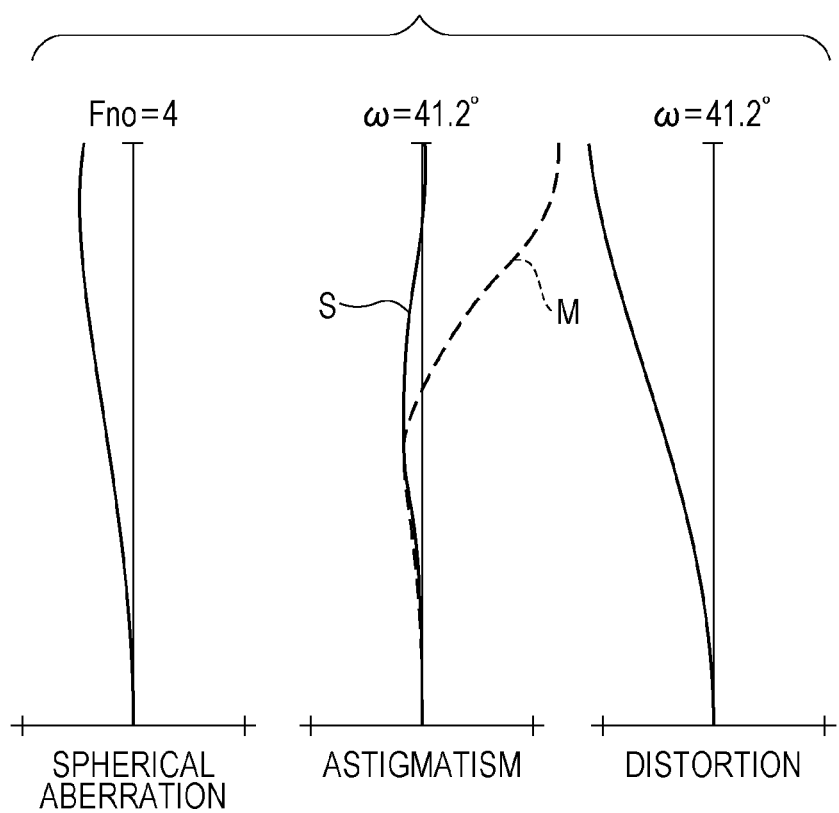

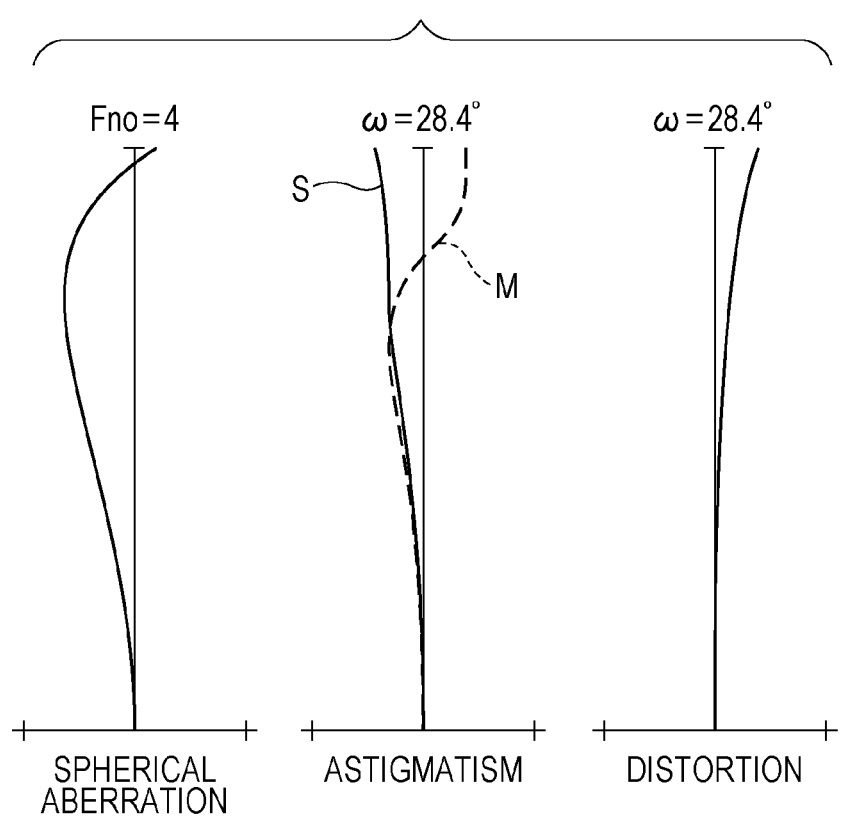

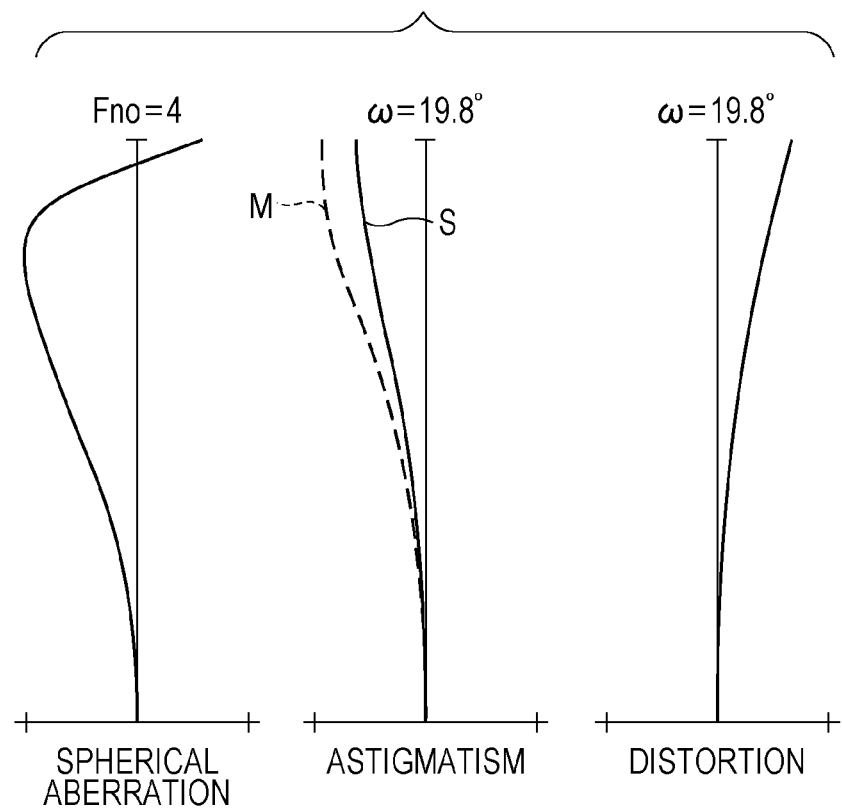

ZOOM LENS AND IMAGE PICKUP APPARATUS INCLUDING THE SAME

BACKGROUND OF THE INVENTION

1. Field of the Invention

The present invention relates to a zoom lens suitable for a still camera, a television camera, a video camera, a photographic camera, a digital camera, etc. More particularly, the present invention relates to a zoom lens using a focusing method that can properly correct aberration over the entire object distance from infinity to the closest photographic distance.

2. Description of the Related Art

As a focusing method adopted in a zoom lens, there is a front focusing method in which a first lens unit located closest to the object side is moved in the optical axis direction. Also, there is an inner focusing or rear focusing method in which a second lens unit or a subsequent lens unit is moved in the optical axis direction. In a focusing method that moves one lens unit, aberration variations are likely to occur during focusing, and it is difficult to obtain high optical performance over the entire focusing range. Particularly, when the object distance is short as required in a macro lens system, large aberration variations occur, and thus it is difficult to maintain high optical performance.

In the current state of the art, there is a zoom lens using a floating method in which a plurality of lens units are moved in the optical axis direction for focusing. The floating method is considered an effective focusing method to suppress aberration variations. In the floating method, the moving amounts of the focus lens units for focusing on an object located at a close distance can be reduced. This reduces the size of the entire lens system, and also reduces aberration variations. In particular, focusing to the close distance, as in macro photographing, can be easily performed while reducing aberration variations.

Japanese Patent Laid-Open No. 61-236516 discloses a zoom lens including, in order from the object side to the image side, a front group having a positive refractive power, a zooming group that moves for zooming, and a relay lens group that does not move for zooming. In this zoom lens, two lens units in the relay lens group are moved for focusing.

A zoom lens disclosed in U.S. Pat. No. 5,701,204 includes, in order from the object side to the image side, a first lens unit having a positive refractive power, a second lens unit having a negative lens unit, and a final lens unit having a negative refractive power. In this zoom lens, the first lens unit and the final lens unit are moved for focusing.

Japanese Patent Laid-Open No. 11-258506 discloses a zoom lens including, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power. The first lens unit and the second lens unit are moved for focusing.

Japanese Patent Laid-Open No. 62-153914 discloses a zoom lens including, in order from the object side to the image side, a front group having a negative refractive power, a zooming group that moves for zooming, and a relay lens group that does not move for zooming. In this zoom lens, two lens units in the relay lens group are moved for focusing.

The floating method is effective in reducing aberration variations in focusing. However, when a plurality of lens units in the zoom lens are simply moved for focusing, it is difficult to reduce aberration variations and to maintain high optical performance.

For example, it is important to properly set the layout of lens units to be moved for zooming, refractive powers of a plurality of lens units to be moved for focusing, and the moving amounts of the lens units. If these settings are improper, it is difficult to obtain high optical performance over the entire focusing range while maintaining a predetermined zoom ratio.

SUMMARY OF THE INVENTION

According to an aspect of the present invention, a zoom lens includes a negative lens unit having a negative refractive power, and a positive lens unit having a positive refractive power and provided on an image side of the negative lens unit. For focusing from infinity to the closest distance, the negative lens unit moves towards image side and the positive lens unit moves towards the object side.

A zoom lens according to another aspect of the present invention includes, in order from an object side to an image side, a front lens group including a plurality of lens units configured to move for zooming, an aperture stop, and a rear lens group including a plurality of lens units configured to move for focusing. The rear lens group includes a negative lens unit having a negative refractive power and configured to move towards the image side for focusing from infinity to the closest distance, and a positive lens unit having a positive refractive power and configured to move towards the object side for the focusing. The following conditional expressions are satisfied:

$$0.3 < |fRN/fR| < 0.8$$

$$0.3 < |fRP/fR| < 0.8$$

where fR represents a focal length of the rear lens group when focus is at infinity at a wide angle end, and fRN and fRP represent focal lengths of the negative lens unit and the positive lens unit.

Further features of the present invention will become apparent from the following description of exemplary embodiments with reference to the attached drawings.

BRIEF DESCRIPTION OF THE DRAWINGS

FIGS. 3A, 3B, and 3C are aberration diagrams at the wide angle end, the intermediate zoom position, and the telephoto end, respectively, at the object distance of infinity, in the first embodiment.

FIGS. 4A, 4B, and 4C are aberration diagrams at the wide angle end, the intermediate zoom position, and the telephoto end, respectively, at the object distance of proximity, in the first embodiment.

FIGS. 7A, 7B, and 7C are aberration diagrams at the wide angle end, the intermediate zoom position, and the telephoto end, respectively, at the object distance of infinity, in the second embodiment.

FIGS. 8A, 8B, and 8C are aberration diagrams at the wide angle end, the intermediate zoom position, and the telephoto end, respectively, at the object distance of proximity, in the second embodiment.

FIGS. 9A, 9B, and 9C are lens cross-sectional views at a wide angle end, an intermediate zoom position, and a telephoto end, respectively, at an object distance of infinity, according to a third embodiment of the present invention.

FIGS. 11A, 11B, and 11C are aberration diagrams at the wide angle end, the intermediate zoom position, and the telephoto end, respectively, at the object distance of infinity, in the third embodiment.

FIGS. 12A, 12B, and 12C are aberration diagrams at the wide angle end, the intermediate zoom position, and the telephoto end, respectively, at the object distance of proximity, in the third embodiment.

FIGS. 15A, 15B, and 15C are aberration diagrams at the wide angle end, the intermediate zoom position, and the telephoto end, respectively, at the object distance of infinity, in the fourth embodiment.

FIGS. 16A, 16B, and 16C are aberration diagrams at the wide angle end, the intermediate zoom position, and the telephoto end, respectively, at the object distance of proximity, in the fourth embodiment.

FIGS. 19A, 19B, and 19C are aberration diagrams at the wide angle end, the intermediate zoom position, and the telephoto end, respectively, at the object distance of infinity, in the fifth embodiment.

FIGS. 20A, 20B, and 20C are aberration diagrams at the wide angle end, the intermediate zoom position, and the telephoto end, respectively, at the object distance of proximity, in the fifth embodiment.

DESCRIPTION OF THE EMBODIMENTS

Figure 1A:
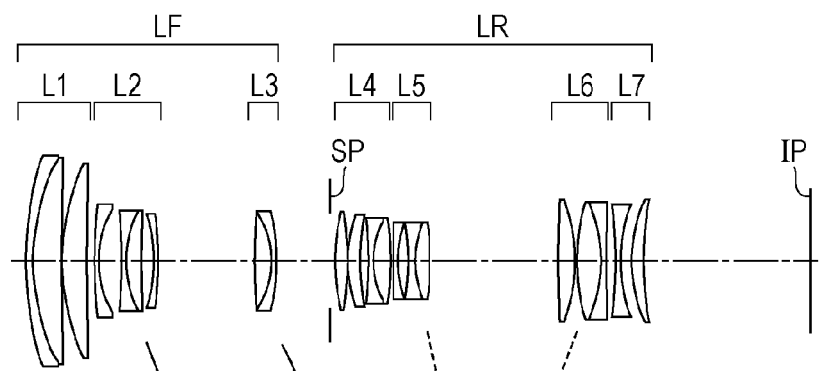
FIGS. 1A, 1B, and 1C are lens cross-sectional views at a wide angle end, an intermediate zoom position, and a telephoto end, respectively, at an object distance of infinity, according to a first embodiment of the present invention.

A zoom lens and an image pickup apparatus including the zoom lens, according to exemplary embodiments of the present invention, will be described below with reference to the enclosed drawings. In a zoom lens of the present invention, a plurality of lens units move for focusing. The zoom lens includes a lens unit N having a negative refractive power, and a lens unit P having a positive refractive power provided on an image side of the lens unit N. For focusing from infinity to the closest distance, the lens unit N moves towards the image side, and the lens unit P moves towards the object side.

The term "closest distance" refers to the shortest photographic distance at each focal length, and corresponds to an end of an in-focus range at each focal length where the photographic distance is shortest. Further, the term "photographic distance" refers to the distance from a distance reference mark provided in a camera body (e.g., an image plane) to an object being photographed. Further, the term "lens unit" in the present invention refers either to a single lens or to a plurality of lenses that move together for zooming or focusing.

In general, for quick automatic focusing (AF), it is preferable to perform focusing with a compact and lightweight lens unit provided on a rear side of a stop. To reduce aberration variations due to focusing, it is preferable to use a floating method in which a plurality of lens units are moved independently. Further, to reduce the size of the entire lens system, it is preferable that the moving amounts of focus lens units for focusing to the closest distance should be small.

In the zoom lens of the present invention, for focusing from infinity to the closest distance, the lens unit N having a negative refractive power provided on the image side of an aperture stop (stop) is moved to the image side, and the lens unit P provided adjacent to the lens unit N on the image side or provided adjacent to the lens unit N with another lens unit being disposed therebetween and having a positive refractive power P is moved to the object side. This increases the maximum photographic magnification, and reduces aberration variations due to focusing.

The focus lens unit N having a negative refractive power and the focus lens unit P having a positive refractive power are arranged in this order from the object side to the image side. If a focus lens unit having a positive refractive power and a focus lens unit having a negative refractive power are arranged in this order, it is difficult to ensure a back focus of the necessary length and to correct aberration variations during focusing.

Next, a description will be given of a basic optical principle for obtaining a high photographic magnification in the zoom lens of the present invention. In a lens configuration in which a zoom section including a lens unit movable for zooming and an imaging section for imaging are arranged in order from the object side to the image side, when a light beam emitted from the zoom section and entering the imaging section is parallel light, the zoom section is called an afocal system. In this case, a focal length f of the entire system and a focal length $f_0$ of the imaging section satisfy the following relational expression:

$$F = \gamma \times f_0.$$

Figure 21:
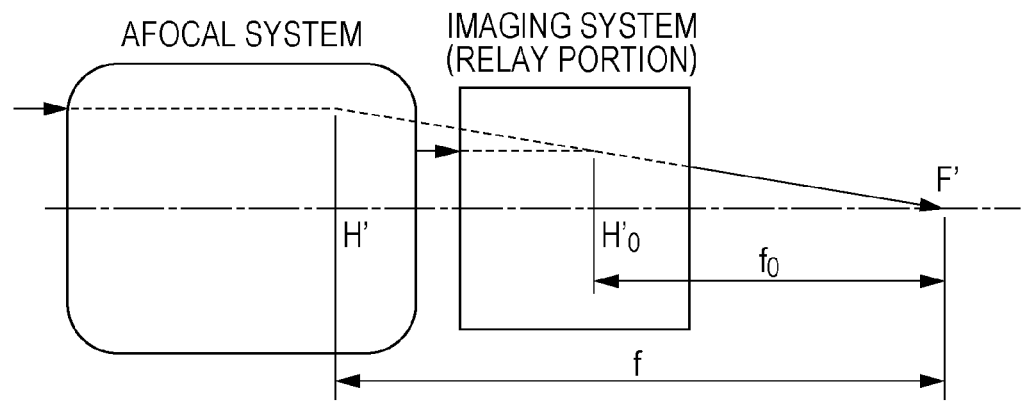
FIG. 21 is a paraxial conceptual view illustrating the basic principle of a zoom lens according to exemplary embodiments of the present invention.

In the expression, $\gamma$ represents the angular magnification, and is defined by the ratio in height from the optical axis between a light beam incident from the object side and a light beam incident on the imaging section. By changing the angular magnification $\gamma$, the focal length of the entire system is changed to achieve a zoom lens. FIG. 21 explains the characteristic of this optical system. When the afocal system is coupled, an image-side principal point position changes from $H'_0$ to $H'$ and the focal length changes, but an image-side focal position $F'$ does not change. When focusing is performed by the imaging section in such an optical system, a photographic magnification $\beta_Z$ of the optical system and a photographic magnification $\beta_R$ of the imaging section satisfy the following relational expression:

$$\beta_Z = \beta_R/\gamma.$$

This relationship is derived as follows. According to Newton's Law in that $x \cdot x' = f^2$ (refer to Yoshiya Matsui, *Renzu Sekkeihou* (Kyoritsu Shuppan Co., Ltd.) 1972), the photographic magnification $\beta_Z$ of the optical system, a distance $x'$ from the image-side focal point to the image plane, and a focal length f of the optical system satisfy the following relational expression:

$$\beta_Z = -x'/f = -x'\cdot\gamma\cdot f_0 = \beta_R/\gamma.$$

When the afocal system is coupled, the distance $x'$ does not change, but the focal length f is changed by the angular magnification $\gamma$. Hence, the photographic magnification of the optical system is determined by the lateral magnification $\beta_R$ of the imaging system and the angular magnification $\gamma$. The photographic magnification over the entire zoom range can be determined by using this principle. For example, in a below-described first numerical example of the present invention, the focal length of a lens unit LR serving as an imaging section is 113 mm, and the angular magnification $\gamma$ at a telephoto end is 1.7. Since the lateral magnification of the imaging section at the closest distance is 0.85, the photographic magnification $\beta_Z$ at the telephoto end is $0.85/1.7 = 0.5$.

In the zoom lens of the present invention, the maximum photographic magnification is the magnification at the closest distance at the telephoto end. Considering the lens unit R as one macro lens optical system, according to the above-described principle, the zoom lens of the present invention can be regarded as an optical system in which the object distance of the macro lens is changed by the zoom optical system located on the object side. In this case, the object distance at the telephoto end is the longest in the entire zoom range. This distance is the shortest photographic distance of the zoom lens that can change the focal length without changing the back focus.

Further, in the present invention, the photographic magnification at the wide angle end can be made higher than the maximum photographic magnification of the zoom lens. In the below-described first numerical example of the present invention, since the angular magnification at the wide angle end is 0.63, the photographic magnification is $0.85/0.63 = 1.3$ in a state in which the focus lens unit moves at the wide angle end by the same amount as for focusing to the closest distance at the telephoto end. By setting the angular magnification $\gamma$, the photographic magnification of the entire zoom system can be made higher than the lateral magnification of the lens unit LR, and photographing at a closer distance can be easily achieved.

In the present invention, the closest distance can be arbitrarily set by the moving amount of the focus lens unit. In this case, even when the maximum photographic magnification is low, floating allows the zoom lens to maintain high performance over the entire focus range.

Figure 1B:
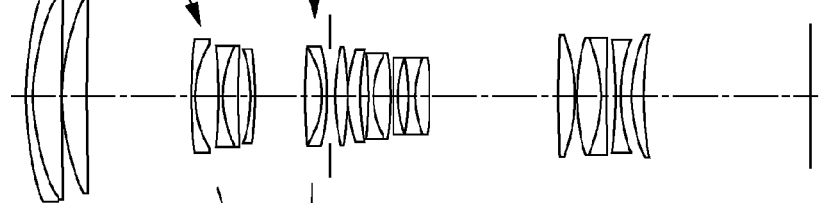
Figure 1C:
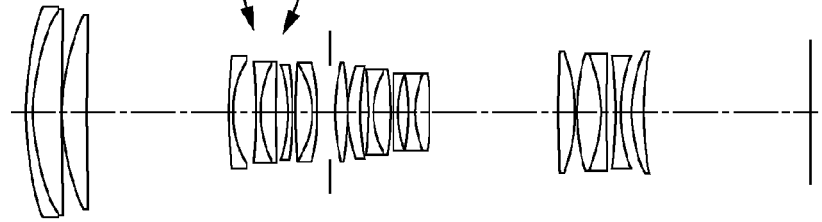
Figure 2A:
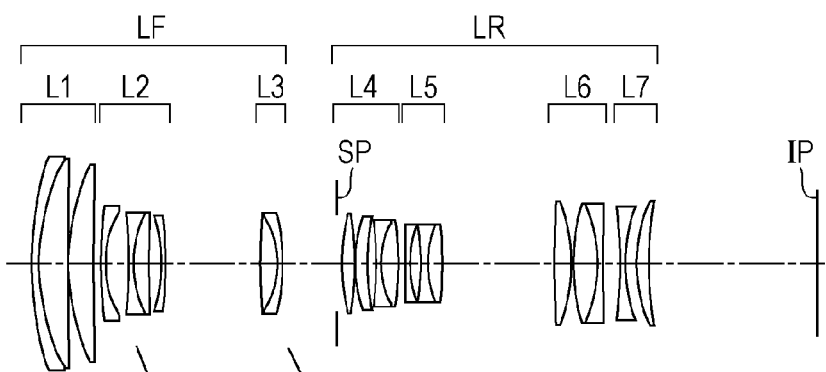
FIGS. 2A, 2B, and 2C are lens cross-sectional views at the wide angle end, the intermediate zoom position, and the telephoto end, respectively, at an object distance of proximity (closest distance), in the first embodiment.
Figure 2B:
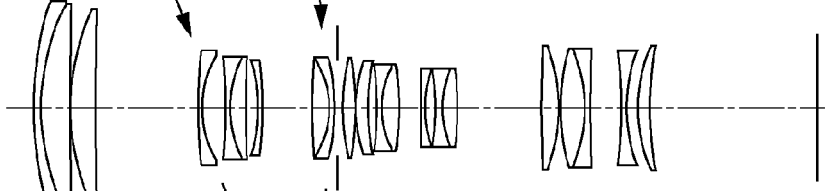
Figure 2C:
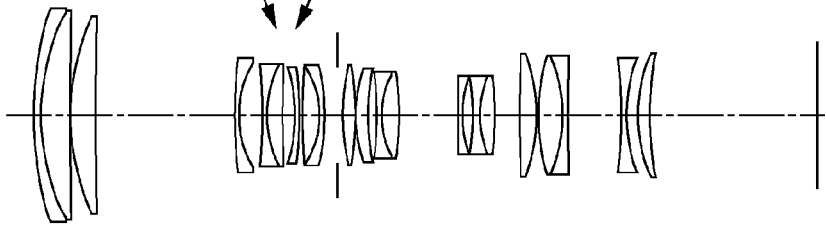

FIGS. 1A, 1B, and 1C are lens cross-sectional views at a wide angle end (short focal length end), an intermediate zoom position, and a telephoto end (long focal length end), respectively, when focus is at infinity in a first embodiment of the present invention. FIGS. 2A, 2B, and 2C are lens cross-sectional views at the wide angle end, the intermediate zoom position, and the telephoto end, respectively, when focus is at the closest distance in the first embodiment. FIGS. 3A, 3B, and 3C are aberration diagrams at the wide angle end, the intermediate zoom position, and the telephoto end, respectively, when focus is at infinity in the first embodiment. FIGS. 4A, 4B, and 4C are aberration diagrams at the wide angle end, the intermediate zoom position, and the telephoto end, respectively, when focus is at the closest distance in the first embodiment.

Figure 5A:
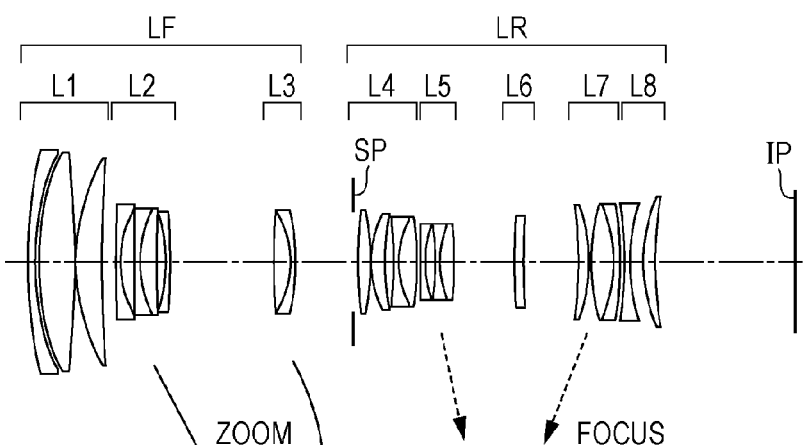
FIGS. 5A, 5B, and 5C are lens cross-sectional views at a wide angle end, an intermediate zoom position, and a telephoto end, respectively, at an object distance of infinity, according to a second embodiment of the present invention.
Figure 5B:
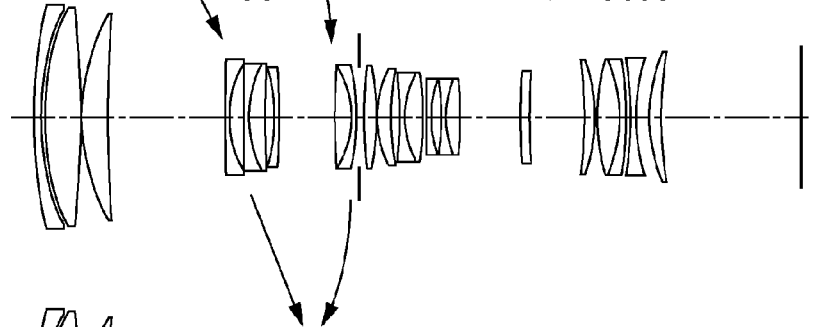
Figure 5C:
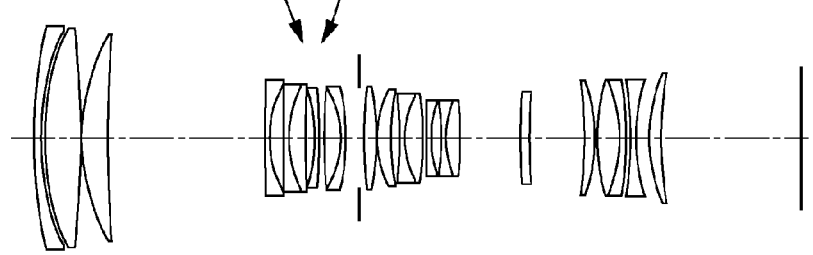
Figure 6A:
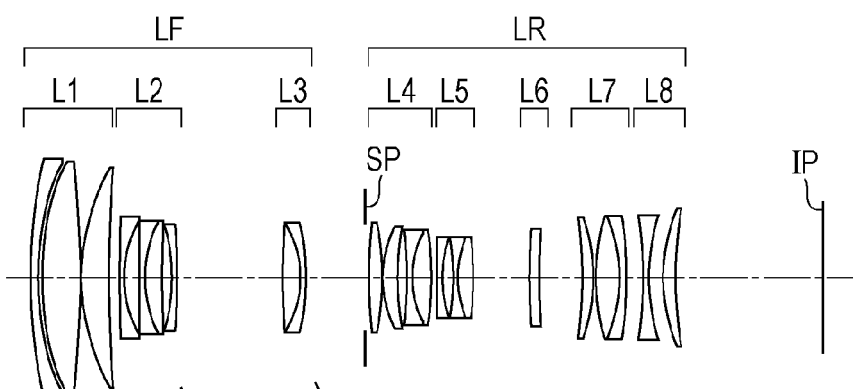
FIGS. 6A, 6B, and 6C are lens cross-sectional views at the wide angle end, the intermediate zoom position, and the telephoto end, respectively, at an object distance of proximity, in the second embodiment.
Figure 6B:
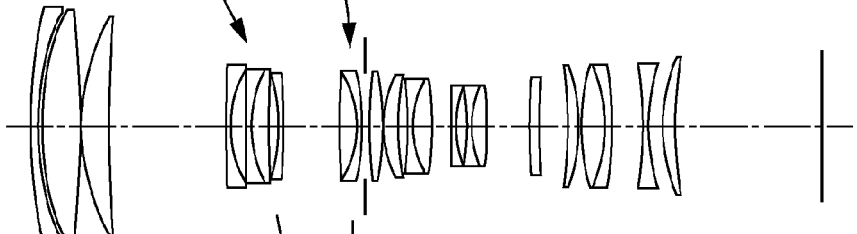
Figure 6C:
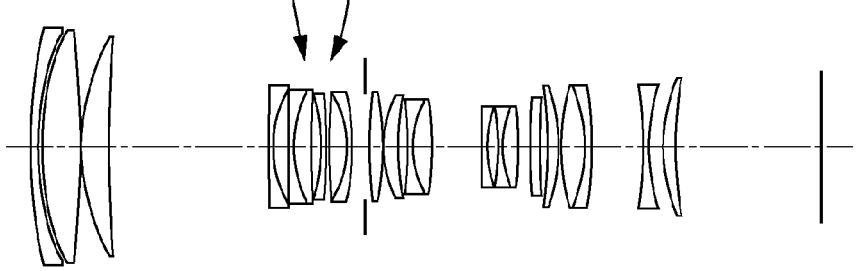
Figure 8A:
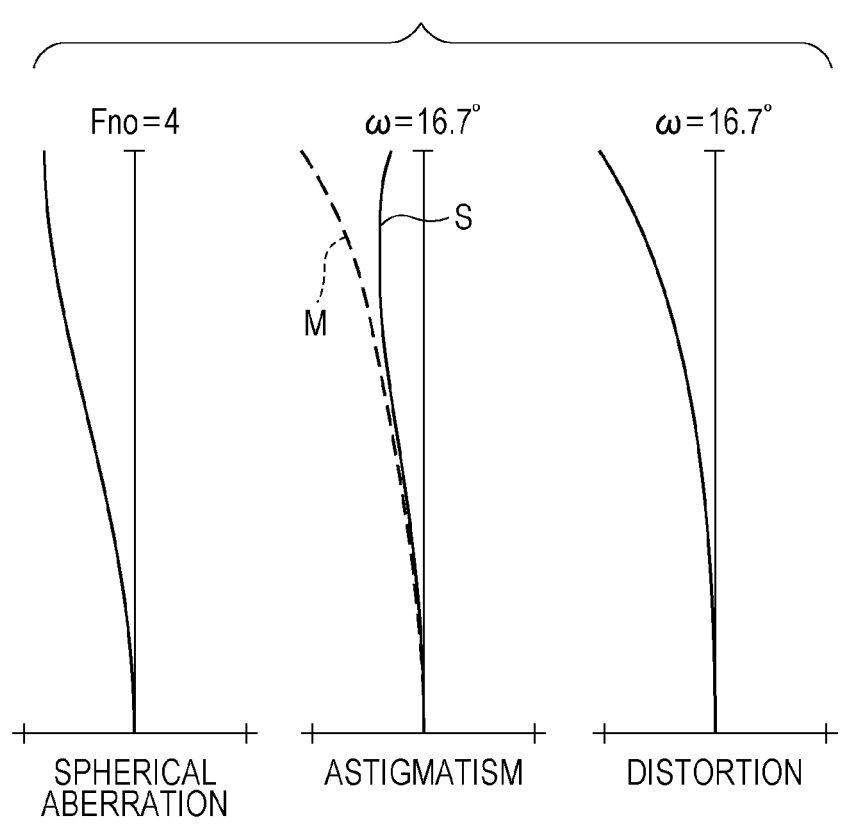

FIGS. 5A, 5B, and 5C are lens cross-sectional views at a wide angle end, an intermediate zoom position, and a telephoto end, respectively, when focus is at infinity in a second embodiment of the present invention. FIGS. 6A, 6B, and 6C are lens cross-sectional views at the wide angle end, the intermediate zoom position, and the telephoto end, respectively, when focus is at the closest distance in the second embodiment. FIGS. 7A, 7B, and 7C are aberration diagrams at the wide angle end, the intermediate zoom position, and the telephoto end, respectively, when focus is at infinity in the second embodiment. FIGS. 8A, 8B, and 8C are aberration diagrams at the wide angle end, the intermediate zoom position, and the telephoto end, respectively, when focus is at the closest distance in the second embodiment.

Figure 10A:
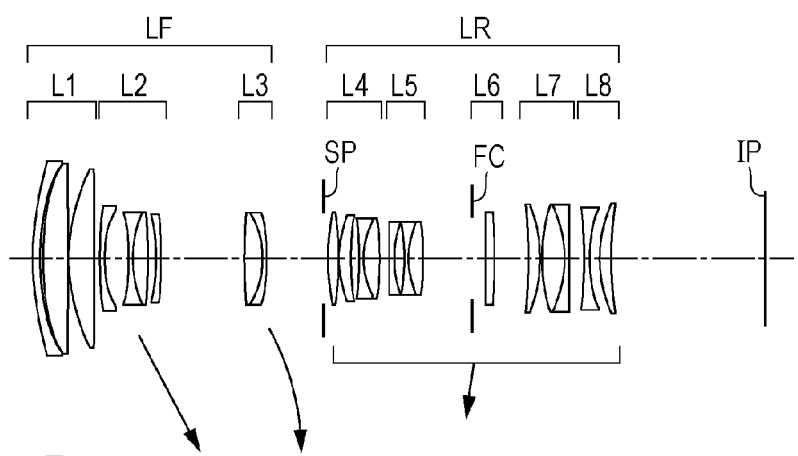
FIGS. 10A, 10B, and 10C are lens cross-sectional views at the wide angle end, the intermediate zoom position, and the telephoto end, respectively, at an object distance of proximity, in the third embodiment.
Figure 10B:
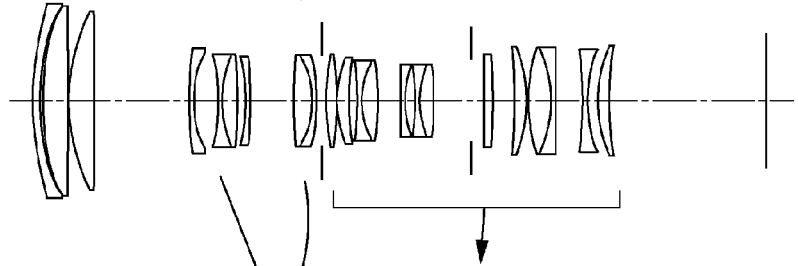
Figure 10C:
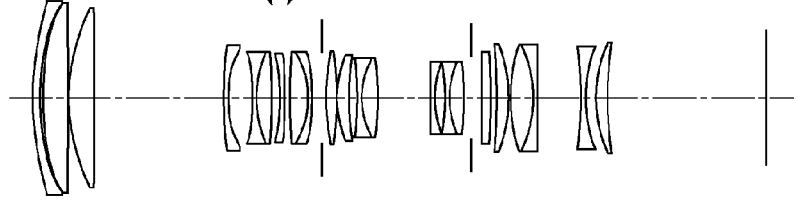

FIGS. 9A, 9B, and 9C are lens cross-sectional views at a wide angle end, an intermediate zoom position, and a telephoto end, respectively, when focus is at infinity in a third embodiment of the present invention. FIGS. 10A, 10B, and 10C are lens cross-sectional views at the wide angle end, the intermediate zoom position, and the telephoto end, respectively, when focus is at the closest distance in the third embodiment. FIGS. 11A, 11B, and 11C are aberration diagrams at the wide angle end, the intermediate zoom position, and the telephoto end, respectively, when focus is at infinity in the third embodiment. FIGS. 12A, 12B, and 12C are aberration diagrams at the wide angle end, the intermediate zoom position, and the telephoto end, respectively, when focus is at the closest distance in the third embodiment.

Figure 13A:
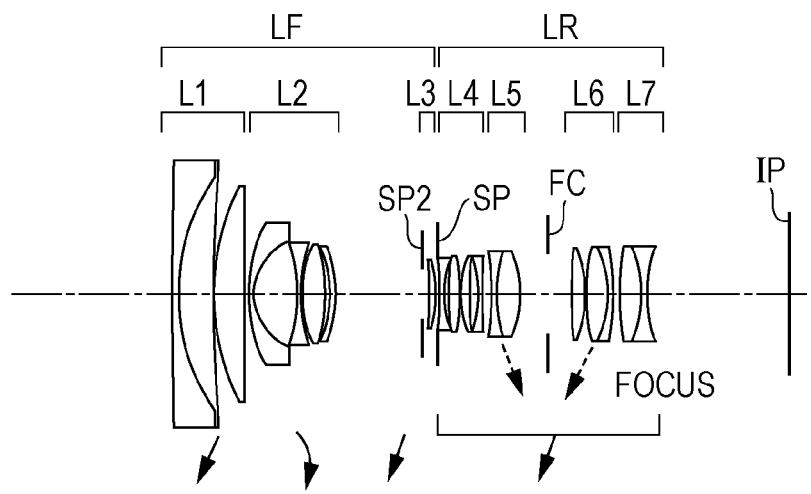
FIGS. 13A, 13B, and 13C are lens cross-sectional views at a wide angle end, an intermediate zoom position, and a telephoto end, respectively, at an object distance of infinity, according to a fourth embodiment of the present invention.
Figure 13B:
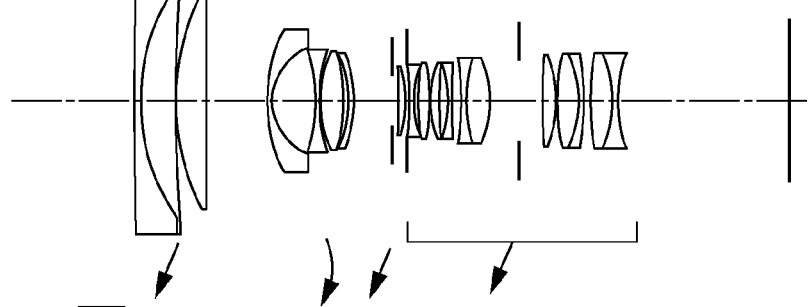
Figure 13C:
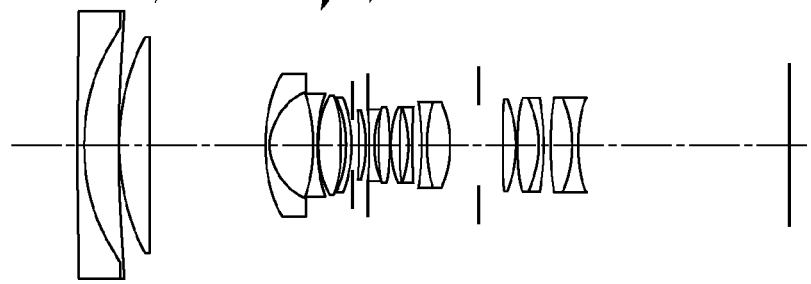
Figure 14A:
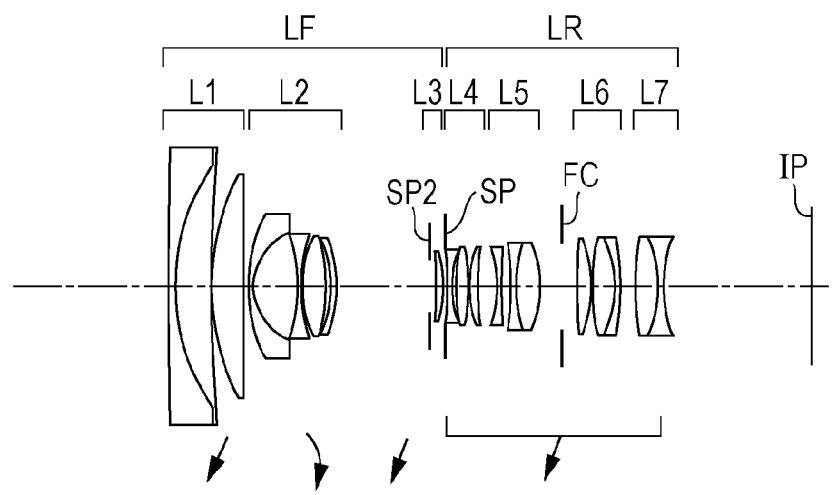
FIGS. 14A, 14B, and 14C are lens cross-sectional views at the wide angle end, the intermediate zoom position, and the telephoto end, respectively, at an object distance of proximity, in the fourth embodiment.
Figure 14B:
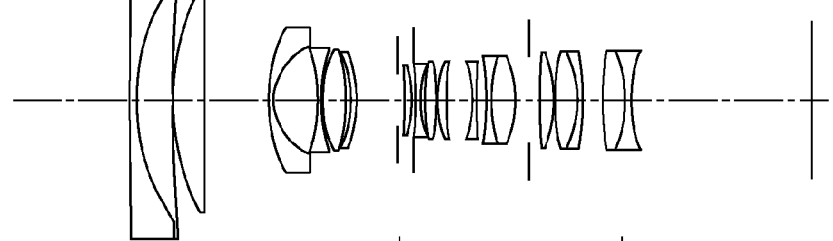
Figure 14C:
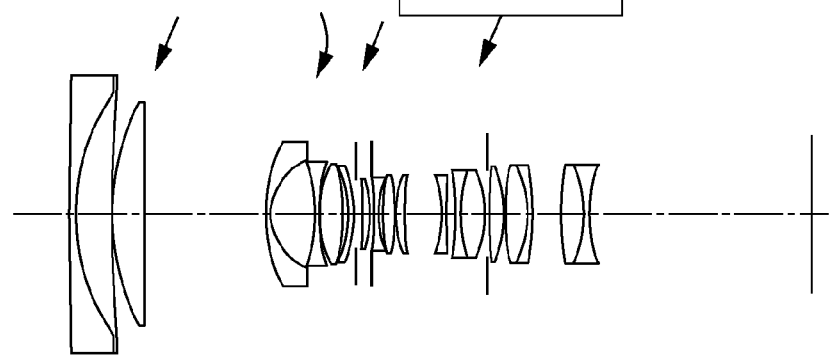

FIGS. 13A, 13B, and 13C are lens cross-sectional views at a wide angle end, an intermediate zoom position, and a telephoto end, respectively, when focus is at infinity in a fourth embodiment of the present invention. FIGS. 14A, 14B, and 14C are lens cross-sectional views at the wide angle end, the intermediate zoom position, and the telephoto end, respectively, when focus is at the closest distance in the fourth embodiment. FIGS. 15A, 15B, and 15C are aberration diagrams at the wide angle end, the intermediate zoom position, and the telephoto end, respectively, when focus is at infinity in the fourth embodiment. FIGS. 16A, 16B, and 16C are aberration diagrams at the wide angle end, the intermediate zoom position, and the telephoto end, respectively, when focus is at the closest distance in the fourth embodiment.

Figure 17A:
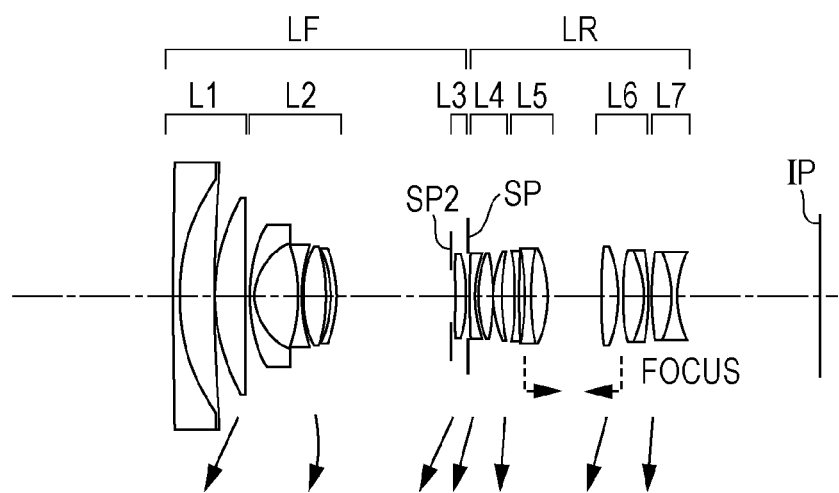
FIGS. 17A, 17B, and 17C are lens cross-sectional views at a wide angle end, an intermediate zoom position, and a telephoto end, respectively, at an object distance of infinity, according to a fifth embodiment of the present invention.
Figure 17B:
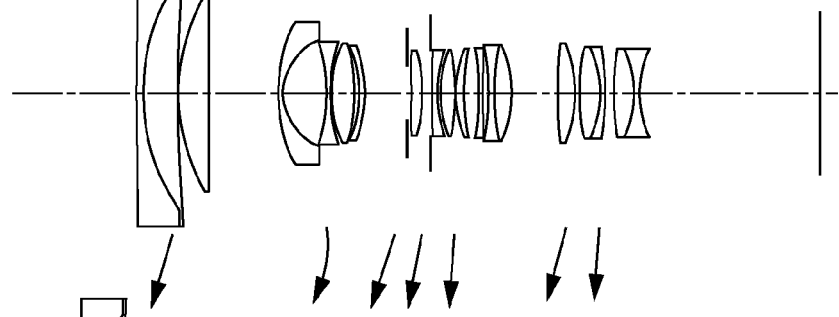
Figure 17C:
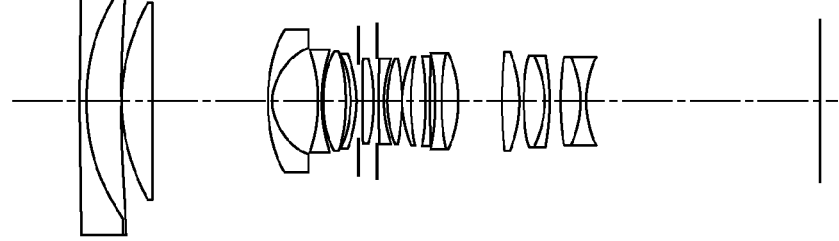
Figure 18A:
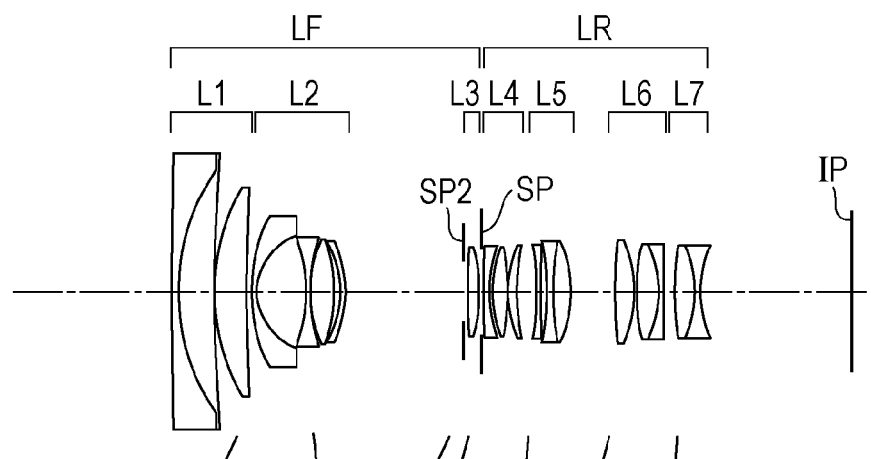
FIGS. 18A, 18B, and 18C are lens cross-sectional views at the wide angle end, the intermediate zoom position, and the telephoto end at an object distance of proximity, in the fifth embodiment.
Figure 18B:
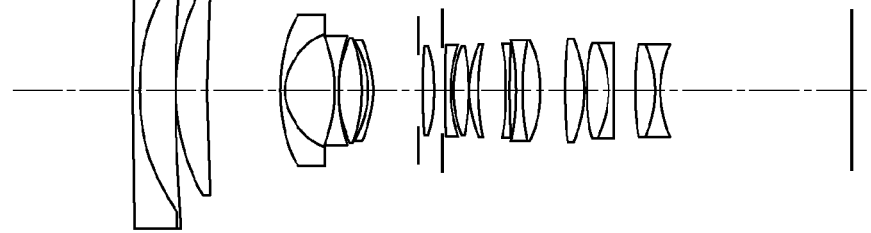
Figure 18C:
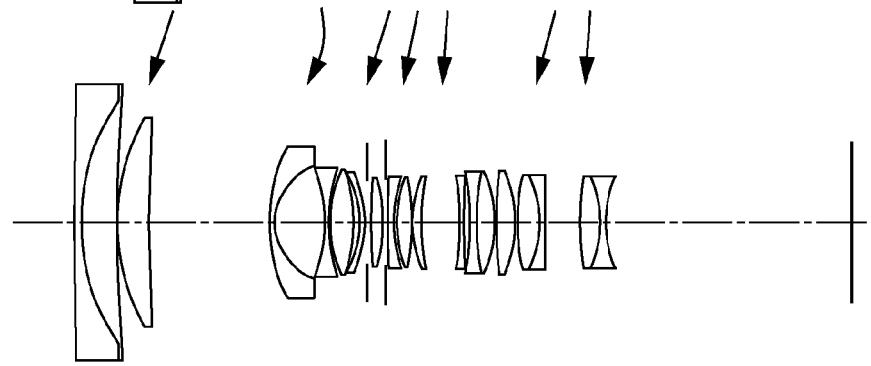
Figure 19B:
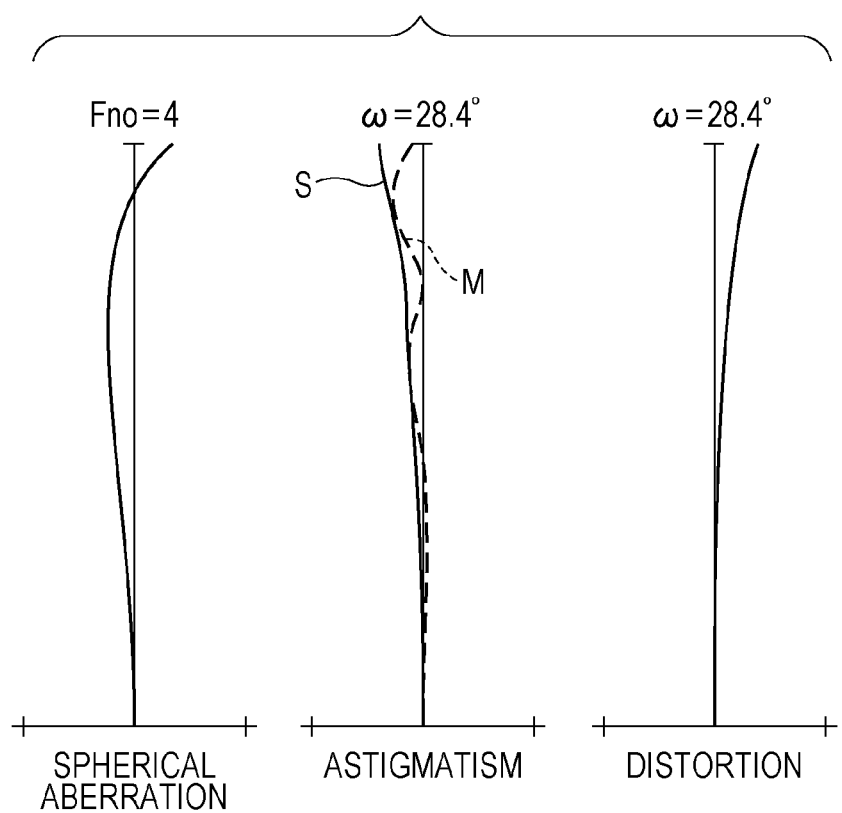

FIGS. 17A, 17B, and 17C are lens cross-sectional views at a wide angle end, an intermediate zoom position, and a telephoto end, respectively, when focus is at infinity in a fifth embodiment of the present invention. FIGS. 18A, 18B, and 18C are lens cross-sectional views at the wide angle end, the intermediate zoom position, and the telephoto end, respectively, when focus is at the closest distance in the fifth embodiment. FIGS. 19A, 19B, and 19C are aberration diagrams at the wide angle end, the intermediate zoom position, and the telephoto end, respectively, when focus is at infinity in the fifth embodiment. FIGS. 20A, 20B, and 20C are aberration diagrams at the wide angle end, the intermediate zoom position, and the telephoto end, respectively, when focus is at the closest distance in the fifth embodiment.

Figure 22:
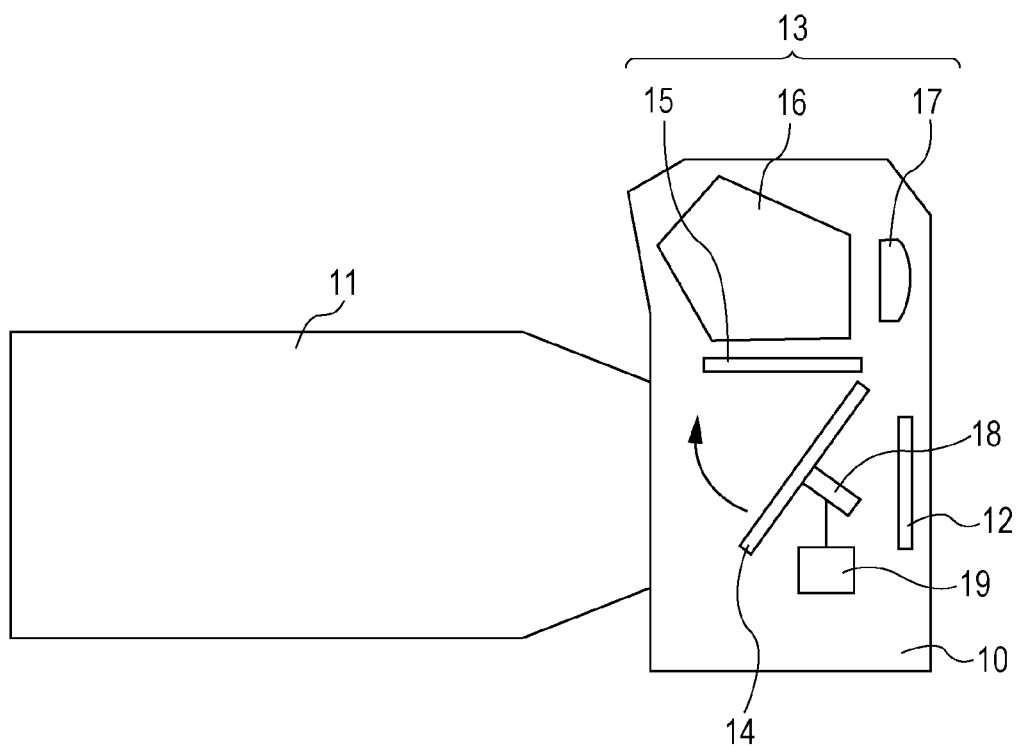
FIG. 22 schematically illustrates the principal components of an image pickup apparatus according to exemplary embodiments of the present invention.

FIG. 21 illustrates a zoom lens according to the present invention. FIG. 22 schematically illustrates the principal part of an image pickup apparatus according to the present invention. In the lens cross-sectional views, the left side is an object side and the right side is an image side. In the lens cross-sectional views, when i represents the order number from the object side, Li represents the i-th lens unit. LF represents a front lens group including a plurality of lens units, SP represents an aperture stop, and LR represents a rear lens group including a plurality of lens units. FC represents a flare cut stop, and SP2 represents a Fno stop that changes the opening diameter in correspondence to zooming so as to change the F-number of the entire system.

An image plane IP corresponds to an image pickup surface of a solid-state image pickup element (photoelectric conversion element), such as a CCD sensor or a CMOS sensor, when the zoom lens is used as an imaging optical system for a video camera or a digital still camera, and to a film surface when the zoom lens is used as an imaging optical system for a silver-halide film camera. Arrows concerning zooming indicate moving loci of the lens units during zooming from the wide angle end to the telephoto end. Dotted arrows concerning focusing indicate moving loci of the lens units during focusing from infinity to the closest distance.

In spherical aberration diagrams, a solid line indicates a d-line. In astigmatism diagrams, a dotted line indicates a meridional image plane, and a solid line indicates a sagittal image plane. Distortion is shown for a d-line. Fno represents the F-number, and ω represents the half angle of view (degrees). In the following embodiments, the wide angle end and the telephoto end respectively refer to zoom positions attained when the lens unit for zooming is positioned at opposite ends of a mechanical movable range on the optical axis.

Next, the characteristics of the zoom lens of the present invention will be described. In the embodiments, a front lens group LF includes a lens unit that moves for zooming and has a negative refractive power, and a lens unit that moves for zooming and has a positive refractive power. A rear lens group LR includes a lens unit N that moves to the image side for focusing from infinity to the closest distance and has a negative refractive power, and a lens unit P that moves to the object side for focusing and has a positive refractive power. The following conditional expressions are satisfied:

$$-10.0 < F_N < 0.0 \quad (1)$$

$$2.0 < F_P < 10.0 \quad (2)$$

where $F_N$ and $F_P$ represent focus sensitivities of the lens unit N and the lens unit P provided when focus is at infinity at the telephoto end.

Conditional Expressions (1) and (2) relate to the focus sensitivities of the lens unit N and the lens unit P that move for focusing. In the expressions, $F_N$ represents the focus sensitivity of the focus lens unit N having a negative refractive power, and $F_P$ represents the focus sensitivity of the focus lens unit P having a positive refractive power.

Here, the term "focus sensitivity" refers to a value defined as "the moving amount of the image point provided when the focus lens unit moves by 1 millimeter (unit amount)." Conditional Expressions (1) and (2) show that the closest distance decreases as the focus lens units move, and are satisfied to efficiently shorten the closest distance and to properly maintain optical performance at the closest distance.

When the focus sensitivity $F_N$ exceeds the upper limit of Conditional Expression (1) and takes a positive value, the lens unit N having the negative refractive power moves to the image side, so that the closest distance is increased, and the size of the entire system is increased. When the negative refractive power of the lens unit N is strong such that the lower limit of Conditional Expression (1) is exceeded, it is difficult to correct changes in aberrations due to focusing.

When the positive refractive power of the lens unit P is strong such that the upper limit of Conditional Expression (2) is exceeded, it is difficult to correct changes in aberrations due to focusing. When the positive refractive power of the lens unit P is weak such that the lower limit of Conditional Expression (2) is exceeded (below), the size of the entire system increases. Further, if the focus sensitivity $F_P$ takes a negative value, the closest distance is increased when the lens unit P having the positive refractive power is moved to the object side. This increases the size of the entire system.

In the embodiments, it is more preferable to satisfy at least one of the following conditional expressions. The zoom lens includes, in order from the object side to the image side, the front lens group LF having a plurality of lens units, the aperture stop SP, and the rear lens group LR having a plurality of lens units. The moving amounts of the lens unit N and the lens unit P for focusing from infinity to the closest distance at the telephoto end are designated as dfN and dfP. The focal length of the rear lens group LR provided when focus is at infinity at the wide angle end is designated as fR.

Lateral magnifications of the rear lens group LR provided when focus is at infinity and at the closest distance at the telephoto end are designated as $\beta_{Rtinf}$ and $\beta_{Rtmod}$. The distance from an object-side lens surface of the rear lens group LR to the front-side principal point position of the rear lens group LR is designated as O1R. In this case, at least one of the following conditional expressions is preferably satisfied:

$$0.08 < |dfN/fR| < 0.30 \quad (3)$$

$$0.08 < |dfP/fR| < 0.30 \quad (4)$$

$$0.8 < |dfN/dfP| < 1.5 \quad (5)$$

$$0.2 < |\beta_{Rtinf} - \beta_{Rtmod}| < 1.0 \quad (6)$$

$$|O1R/fR| < 0.5 \quad (7)$$

where the sign of the moving amount is positive when the lens unit moves to the image side, and is negative when the lens unit moves to the object side.

Conditional Expressions (3) and (4) relate to the moving amounts of the lens unit N and the lens unit P that move for focusing, and are to be satisfied to shorten the closest distance.

When the moving amounts of the lens unit N and the lens unit P increase such that upper limits of Conditional Expressions (3) and (4) are exceeded, the size of the entire system increases. When the moving amounts of the focus lens units decrease such that the lower limits of Conditional Expressions (3) and (4) are exceeded, it is difficult to perform focusing from infinity to the closest distance unless the refractive powers of the lens unit N and the lens unit P are increased. When the refractive powers of the lens unit N and the lens unit P are increased, changes in aberrations due to focusing increase, and become difficult to correct.

Further, Conditional Expression (5) indicates the ratio between the moving amounts of the lens unit N and the lens unit P that move for focusing. When the lens unit N having the negative refractive power is moved to the image side, spherical aberration moves in the over-corrected direction, and the image plane moves in the under-corrected direction. When the lens unit P having the positive refractive power is moved to the object side, spherical aberration moves in the under direction, and the image plane moves in the over direction.

By moving the lens unit N and the lens unit P to satisfy Conditional Expression (5), aberration variations are cancelled, and high optical performance at the closest distance is obtained easily. When the upper limit and the lower limit of Conditional Expression (5) are exceeded, an aberration variation in focusing increases in the focus lens unit whose moving amount is larger, and it is difficult to properly maintain optical performance at the closest distance.

Conditional Expression (6) relates to the imaging magnifications at the infinity and the closest distance of the rear lens group LR on the image side of the aperture stop SP at the telephoto end. When the lateral magnification of the rear lens group LR is high such that the upper limit of Conditional Expression (6) is exceeded, it is difficult to correct aberration variations in zooming and focusing. When the lateral magnification of the rear lens group LR is low such that the lower limit of Conditional Expression (6) is exceeded, it is difficult to obtain a desired maximum photographic magnification.

Conditional Expression (7) indicates the range of the front-side principal point position provided when focus is at infinity at the wide angle end of the rear lens group LR provided on the rear side of the aperture stop SP, and is to be satisfied to reduce the size of the zoom lens. When the front-side principal point position on the rear side of the aperture stop SP is close to the image side such that the upper limit of Conditional Expression (7) is exceeded, the effective diameter of the focus lens units, particularly the lens unit P with a positive refractive power located on the image side is increased by the height of off-axis rays. This increases the size of the entire system. Also, the focus lens units increase in weight, and quick AF is difficult.

The rear lens group LR located on the image side of the aperture stop SP functions as a macro lens system that increases the photographic magnification at the closest distance. When Conditional Expression (7) is satisfied, it is difficult to increase the refractive powers of the lens unit N having a negative refractive power and the lens unit P having a positive refractive power and located on the image side of the lens unit N. As a result, it is difficult to set the maximum photographic magnification of the macro lens system to be high, unlike a macro lens system having a single focal length.

In contrast, in the zoom lens of the present invention, the angular magnification γ for obtaining a desired photographic magnification is set according to the above-described principle. This eliminates the necessity to ensure a photographic magnification similar to the photographic magnification in the macro lens system. Thus, a high photographic magnification is obtained while reducing the size of the zoom lens. In the embodiments, an image blur due to vibration may be corrected by moving any lens in the optical system as an image stabilizing lens in a direction having a component perpendicular to the optical axis.

As described above, according to the embodiments, it is possible to provide a zoom lens having the maximum photographic magnification of about 0.5 and having high optical performance over the entire zoom range and the entire focus range.

Next, the characteristics of the lens configurations in the zoom lenses of the embodiments will be described.

In the zoom lens of the first embodiment, a front lens group LF includes, in order from the object side to the image side, a first lens unit L1 having a positive refractive power, a second lens unit L2 having a negative refractive power, and a third lens unit L3 having a positive refractive power. A rear lens group LR includes a fourth lens unit L4 having a positive refractive power, a fifth lens unit L5 having a negative refractive power, a sixth lens unit L6 having a positive refractive power, and a seventh lens unit L7 having a negative refractive power.

For zooming from the wide angle end to the telephoto end, the second lens unit L2 moves to the image side, and the third lens unit L3 moves along a locus convex towards the image side. For focusing from infinity to the closest distance, the fifth lens unit (lens unit N) L5 moves to the image side, and the sixth lens unit (lens unit P) L6 moves to the object side. During zooming from the wide angle end to the telephoto end, the second lens unit L2 performs main zooming, and the image plane moved by zooming is corrected by movement of the third lens unit L3. Movements of the two lens units achieve necessary zooming and reduce changes in aberrations due to zooming.

While the two lens units move for focusing in the first embodiment, two or more lens units may be moved to further reduce aberration variations during focusing. In the first embodiment, the values in Conditional Expressions (1) to (7) are preferably set to be within the following numerical ranges:

$$-5.0 < F_N < -2 \tag{1a}$$

$$2.0 < F_P < 5.0 \tag{2a}$$

$$0.10 < |dfN/fR| < 0.30 \tag{3a}$$

$$0.10 < |dfP/fR| < 0.30 \tag{4a}$$

$$1.1 < |dfN/dfP| < 1.5 \tag{5a}$$

$$0.7 < |\beta_{Rtinf} - \beta_{Rtmod}| < 1.0 \tag{6a}$$

$$|O1R/fR| < 0.4 \tag{7a}.$$

In the zoom lens of the second embodiment, a front lens group LF includes, in order from the object side to the image side, a first lens unit L1 having a positive refractive power, a second lens unit L2 having a negative refractive power, and a third lens unit L3 having a positive refractive power. A rear lens group LR includes a fourth lens unit L4 having a positive refractive power, a fifth lens unit L5 having a negative refractive power, a sixth lens unit L6 having a positive refractive power, a seventh lens unit L7 having a positive refractive power, and an eighth lens unit L8 having a negative refractive power.

For zooming from the wide angle end to the telephoto end, the second lens unit L2 moves to the image side, and the third lens unit L3 moves along a locus convex towards the image side. For focusing from infinity to the closest distance, the fifth lens unit (lens unit N) L5 moves to the image side, and the seventh lens unit (lens unit P) L7 moves to the object side. During zooming from the wide angle end to the telephoto end, the second lens unit L2 performs main zooming, and the image plane moved by zooming is corrected by movement of the third lens unit L3. Movements of the two lens units achieve necessary zooming, and reduce changes in aberrations due to zooming.

While the two lens units move for focusing in the second embodiment, two or more lens units may be moved to further reduce aberration variations in focusing. In the second embodiment, the values in Conditional Expressions (1) to (7) are more preferably set to be within the following numerical ranges:

$$-10.0 < F_N < -5.0 \tag{1b}$$

$$2.0 < F_P < 9.0 \tag{2b}$$

$$0.10 < |dfN/fR| < 0.30 \tag{3b}$$

$$0.10 < |dfP/fR| < 0.30 \tag{4b}$$

$$0.9 < |dfN/dfP| < 1.2 \quad (5b)$$

$$0.6 < |\beta_{Rtinf} - \beta_{Rtmod}| < 1.0 \quad (6b)$$

$$0.0 < |O1R/fR| < 0.2 \quad (7b).$$

In the zoom lens of the third embodiment, a front lens group LF includes, in order from the object side to the image side, a first lens unit L1 having a positive refractive power, a second lens unit L2 having a negative refractive power, and a third lens unit L3 having a positive refractive power. A rear lens group LR includes a fourth lens unit L4 having a positive refractive power, a fifth lens unit L5 having a negative refractive power, a sixth lens unit L6 having a positive refractive power, a seventh lens unit L7 having a positive refractive power, and an eighth lens unit L8 having a negative refractive power.

For zooming from the wide angle end to the telephoto end, the second lens unit L2 moves to the image side, and the third lens unit L3 moves along a locus convex towards the image side. The fourth lens unit L4 to the eighth lens unit L8 move together to the object side. For focusing from infinity to the closest distance, the fifth lens unit (lens unit N) L5 moves to the image side, and the seventh lens unit (lens unit P) L7 moves to the object side.

During zooming from the wide angle end to the telephoto end, the second lens unit L2 performs main zooming, and the image plane moved by zooming is corrected by movement of the third lens unit L3. Movements of the two lens units for zooming achieve necessary zooming, and reduce changes in aberrations due to zooming.

While the two lens units move for focusing in the third embodiment, two or more lens units may be moved to further reduce aberration variations in focusing. In the third embodiment, the values in Conditional Expressions (1) to (7) are more preferably set to be within the following numerical ranges:

$$-10.0 < F_N < -2.0 \quad (1c)$$

$$2.0 < F_P < 5.0 \quad (2c)$$

$$0.10 < |dfN/fR| < 0.30 \quad (3c)$$

$$0.10 < |dfP/fR| < 0.30 \quad (4c)$$

$$1.0 < |dfN/dfP| < 1.5 \quad (5c)$$

$$0.7 < |\beta_{Rtinf} - \beta_{Rtmod}| < 1.0 \quad (6c)$$

$$0.0 < |O1R/fR| < 0.2 \quad (7c).$$

In the zoom lens of the fourth embodiment, a front lens group LF includes, in order from the object side to the image side, a first lens unit L1 having a positive refractive power, a second lens unit L2 having a negative refractive power, and a third lens unit L3 having a positive refractive power. A rear lens group LR includes a fourth lens unit L4 having a positive refractive power, a fifth lens unit L5 having a negative refractive power, a sixth lens unit L6 having a positive refractive power, and a seventh lens unit L7 having a negative refractive power.

For zooming from the wide angle end to the telephoto end, the first lens unit L1 moves to the object side, the second lens unit L2 moves along a locus convex towards the image side, and the third lens unit L3 moves to the object side. The fourth lens unit L4 to the eighth lens unit L8 move together to the object side. For focusing from infinity to the closest distance, the fifth lens unit (lens unit N) L5 moves to the image side, and the sixth lens unit (lens unit P) L6 moves to the object side.

During zooming from the wide angle end to the telephoto end, the first, third, and fourth to eighth lens units perform zooming, and the image plane moved by zooming is corrected by movement of the second lens unit L2. Movements of a plurality of lens units for zooming achieve necessary zooming, and reduce changes in aberrations due to zooming.

While the two lens units move for focusing in the fourth embodiment, two or more lens units may be moved to further reduce aberration variations in focusing. In the fourth embodiment, the values in Conditional Expressions (1) to (7) are more preferably set to be within the following numerical ranges:

$$-2.0 < F_N < 0.0 \quad (1d)$$

$$3.0 < F_P < 8.0 \quad (2d)$$

$$0.10 < |dfN/fR| < 0.30 \quad (3d)$$

$$0.09 < |dfP/fR| < 0.30 \quad (4d)$$

$$0.9 < |dfN/dfP| < 1.5 \quad (5d)$$

$$0.4 < \beta_{Rtinf} - \beta_{Rtmod} < 0.8 \quad (6d)$$

$$0.1 < |O1R/fR| < 0.3 \quad (7d).$$

In the zoom lens of the fifth embodiment, a front lens group LF includes, in order from the object side to the image side, a first lens unit L1 having a positive refractive power, a second lens unit L2 having a negative refractive power, and a third lens unit L3 having a positive refractive power. A rear lens group LR includes a fourth lens unit L4 having a positive refractive power, a fifth lens unit L5 having a negative refractive power, a sixth lens unit L6 having a positive refractive power, and a seventh lens unit L7 having a negative refractive power.

For zooming from the wide angle end to the telephoto end, the first lens unit L1 and the third lens unit L3 to the seventh lens unit L7 move towards the object side along different loci, and the second lens unit L2 moves along a locus convex towards the image side. For focusing from infinity to the closest distance, the fifth lens unit (lens unit N) L5 moves to the image side, and the sixth lens unit (lens unit P) L6 moves to the object side.

During zooming from the wide angle end to the telephoto end, the first, third, and fourth to seventh lens units perform zooming, and the image plane moved by zooming is corrected by movement of the second lens unit L2. During zooming, all of the lens units independently move, so that necessary zooming is achieved, and changes in aberrations due to zooming are reduced.

While the two lens units move for focusing in the fifth embodiment, two or more lens units may be moved to further reduce aberration variations in focusing. In the fifth embodiment, the values in Conditional Expressions (1) to (7) are more preferably set to be within the following numerical ranges:

$$-2.0 < F_N < 0.0 \quad (1e)$$

$$4.0 < F_P < 8.0 \quad (2e)$$

$$0.08 < |dfN/fR| < 0.25 \quad (3e)$$

$$0.08 < |dfP/fR| < 0.25 \quad (4e)$$

$$1.0 < |dfN/dfP| < 1.5 \quad (5e)$$

$$0.3 < \beta_{Rtinf} - \beta_{Rtmod} < 0.6 \quad (6e)$$

$$0.1 < |O1R/fR| < 0.2 \quad (7e).$$

Next, first to fifth numerical examples corresponding to the first to fifth embodiments of the present invention will be given below.

In the numerical examples, i represents the order number of the lens surface counted from the object side, ri represents the radius of curvature of the i-th lens surface, di represents the distance between the i-th lens surface and the i+1-th lens surface, and ndi and vdi respectively represent the refractive index and the Abbe number of the material of each lens for the d-line ($\lambda$=587.6 nm). Where a give surface is aspheric, A4, A6, A8, and A10 are aspherical coefficients. The shape of the aspherical surface is expressed by the following expression where an intersection of the lens surface and the optical axis is the origin, a light advancing direction is a positive direction, X represents the position in the optical axis direction, and H represents the position in a direction perpendicular to the optical axis:

$$X = \frac{(1/R)H^2}{1+\sqrt{1-(H/R)^2}} + A4H^4 + A6H^6 + A8H^8 + A10H^{10}$$

In the above expression, R represents the paraxial radius of curvature, a notation "E-z" is equivalent to "$1\times10^{-z}$", and BR represents back focus. The relationships between the numerical examples and the above-described conditional expressions are shown in Table 1.

First Numerical Example
Unit mm

Surface Data

| Surface No. | r | d | nd | vd | Effective Diameter |
|---|---|---|---|---|---|
| 1 | 100.925 | 2.1 | 1.69895 | 30.1 | 61.79 |
| 2 | 65.156 | 0.31 | | | 60 |
| 3 | 66.709 | 8.35 | 1.43387 | 95.1 | 60.01 |
| 4 | 1206.703 | 0.15 | | | 59.58 |
| 5 | 71.044 | 7.34 | 1.497 | 81.5 | 57.44 |
| 6 | 1793.281 | (variable) | | | 56.64 |
| 7 | 157.425 | 1.2 | 1.804 | 46.6 | 32.52 |
| 8 | 31.727 | 6.84 | | | 29.82 |
| 9 | −134.64 | 1.25 | 1.497 | 81.5 | 28.97 |
| 10 | 33.05 | 4.77 | 1.80518 | 25.4 | 28.1 |
| 11 | 493.419 | 3.61 | | | 27.57 |
| 12 | −47.186 | 1.25 | 1.801 | 35 | 26.84 |
| 13 | −172.301 | (variable) | | | 27.24 |
| 14 | 190.401 | 4.9 | 1.6968 | 55.5 | 27.89 |
| 15 | −29.377 | 1.4 | 1.83481 | 42.7 | 28 |
| 16 | −68.103 | (variable) | | | 28.67 |
| 17(stop) | ∞ | 1.4 | | | 28.69 |
| 18 | 62.76 | 3.57 | 1.6727 | 32.1 | 28.69 |
| 19 | −98.523 | 0.2 | | | 28.53 |
| 20 | 42.855 | 3.8 | 1.6968 | 55.5 | 26.73 |
| 21 | 80.685 | 2.44 | | | 25.18 |
| 22 | −91.944 | 1.6 | 1.80518 | 25.4 | 24.7 |
| 23 | 28.001 | 5.04 | 1.59282 | 68.6 | 23.32 |
| 24 | −77.381 | (variable) | | | 22.99 |
| 25 | 1629.791 | 1.37 | 1.84666 | 23.9 | 22.17 |
| 26 | 36.519 | 3.14 | | | 21.36 |
| 27 | −64.404 | 2.05 | 1.6223 | 53.2 | 21.36 |
| 28 | 31.211 | 4.32 | 1.80809 | 22.8 | 21.99 |
| 29 | −119.497 | (variable) | | | 22.05 |
| 30 | 357.537 | 5.04 | 1.72 | 50.2 | 35.22 |
| 31 | −53.635 | 0.5 | | | 35.53 |
| 32 | 62.636 | 7.26 | 1.6223 | 53.2 | 34.52 |
| 33 | −43.07 | 1.5 | 1.883 | 40.8 | 34.09 |
| 34 | 645.292 | (variable) | | | 33.32 |
| 35 | −131.214 | 1.5 | 1.834 | 37.2 | 32.96 |
| 36 | 45.5 | 3.29 | | | 32.9 |
| 37 | 43.514 | 3.54 | 1.883 | 40.8 | 35.8 |
| 38 | 96.86 | (variable) | | | 35.67 |
| Image Plane | ∞ | | | | |

Various Data
Zoom ratio 2.68

| | Wide angle end | Intermediate position | Telephoto end |
|---|---|---|---|
| Focal length | 72.11 | 131.37 | 193.4 |
| F-number | 4 | 4 | 4 |
| Angle of view | 16.7 | 9.35 | 6.38 |
| Image height | 21.64 | 21.64 | 21.64 |
| Total lens length | 234.52 | 234.52 | 234.52 |
| BF | 50.12 | 50.12 | 50.12 |
| d6 | 2.37 | 31.13 | 42.35 |
| d13 | 28.82 | 15.21 | 0.95 |
| d16 | 16.3 | 1.16 | 4.19 |
| d24 | 0.71 | 0.71 | 0.71 |
| d29 | 38.39 | 38.39 | 38.39 |
| d34 | 2.78 | 2.78 | 2.78 |
| d38 | 50.12 | 50.12 | 50.12 |
| Entrance pupil position | 59.23 | 131.61 | 171.53 |
| Exit pupil position | −97.31 | −97.31 | −97.31 |
| Front principal point position | 96.07 | 145.92 | 111.23 |
| Rear principal point position | −21.99 | −81.25 | −143.27 |

Zoom Lens Unit Data

| Unit | First surface | Focal length | Lens length | Front principal point position | Rear principal point position |
|---|---|---|---|---|---|
| 1 | 1 | 111.53 | 18.25 | 4.86 | −7.69 |
| 2 | 7 | −32.51 | 18.92 | 5.2 | −8.85 |
| 3 | 14 | 89.69 | 6.3 | 2.81 | −0.88 |
| 4 | 17 | 55.87 | 18.05 | 0.36 | −12.1 |
| 5 | 25 | −54.26 | 10.89 | −1.54 | −9.53 |
| 6 | 30 | 53.49 | 14.29 | 0.86 | −7.59 |
| 7 | 35 | −78.84 | 8.33 | −1.22 | −7.24 |

Single Lens Data

| Lens | First surface | Focal length |
|---|---|---|
| 1 | 1 | −269.54 |
| 2 | 3 | 162.39 |
| 3 | 5 | 148.63 |
| 4 | 7 | −49.63 |
| 5 | 9 | −53.26 |
| 6 | 10 | 43.79 |
| 7 | 12 | −81.49 |
| 8 | 14 | 36.86 |
| 9 | 15 | −62.92 |
| 10 | 18 | 57.5 |
| 11 | 20 | 125.98 |
| 12 | 22 | −26.5 |
| 13 | 23 | 35.31 |
| 14 | 25 | −44.14 |
| 15 | 27 | −33.51 |
| 16 | 28 | 31.02 |
| 17 | 30 | 65.11 |
| 18 | 32 | 42.12 |
| 19 | 33 | −45.68 |
| 20 | 35 | −40.35 |
| 21 | 37 | 86.78 |

Second Numerical Example
Unit mm
Surface Data

| Surface No. | r | d | nd | vd | Effective Diameter |
|---|---|---|---|---|---|
| 1 | 142.116 | 2.1 | 1.72047 | 34.7 | 61.09 |
| 2 | 75.448 | 0.5 | | | 59.57 |
| 3 | 75.024 | 10 | 1.43387 | 95.1 | 59.61 |
| 4 | −258.928 | 0.15 | | | 59.17 |
| 5 | 59.745 | 7.3 | 1.43387 | 95.1 | 55.63 |
| 6 | 350.491 | (variable) | | | 54.74 |
| 7 | 494.288 | 1.2 | 1.804 | 46.6 | 31.2 |
| 8 | 32.35 | 4 | | | 28.67 |
| 9 | 1145.599 | 1.25 | 1.497 | 81.5 | 28.46 |
| 10 | 28.377 | 4.77 | 1.80518 | 25.4 | 27.52 |
| 11 | 222.399 | 2.5 | | | 26.96 |
| 12 | −49.976 | 1.25 | 1.801 | 35 | 26.82 |
| 13 | −366.162 | (variable) | | | 26.74 |
| 14 | 155.236 | 4.9 | 1.6968 | 55.5 | 27.22 |
| 15 | −28.249 | 1.4 | 1.83481 | 42.7 | 27.32 |
| 16 | −65.951 | (variable) | | | 27.96 |
| 17(stop) | ∞ | 1.4 | | | 27.69 |
| 18 | 127.375 | 3.57 | 1.6727 | 32.1 | 27.65 |
| 19 | −76.515 | 0.2 | | | 27.5 |
| 20 | 31.655 | 3.8 | 1.6968 | 55.5 | 25.73 |
| 21 | 85.018 | 2.24 | | | 24.53 |
| 22 | −111.684 | 1.6 | 1.80518 | 25.4 | 23.93 |
| 23 | 26.296 | 5.04 | 1.59282 | 68.6 | 22.34 |
| 24 | −75.11 | (variable) | | | 21.89 |
| 25 | 467.939 | 1.37 | 1.84666 | 23.9 | 20.81 |
| 26 | 29.607 | 2.86 | | | 19.78 |
| 27 | −61.646 | 1.08 | 1.6223 | 53.2 | 19.76 |
| 28 | 24.917 | 4.32 | 1.80809 | 22.8 | 20.14 |
| 29 | −100.428 | (variable) | | | 20.12 |
| 30 | 160.401 | 2.5 | 1.76182 | 26.5 | 24.23 |
| 31 | 106.675 | (variable) | | | 24.63 |
| 32 | −142.61 | 3.08 | 1.80518 | 25.4 | 30.72 |
| 33 | −42.788 | 0.5 | | | 31.06 |
| 34 | 59.299 | 6.42 | 1.51742 | 52.4 | 31.06 |
| 35 | −37.718 | 1.5 | 2.00069 | 25.5 | 30.86 |
| 36 | −114.687 | (variable) | | | 31.16 |
| 37 | −83.271 | 1.5 | 1.834 | 37.2 | 31.04 |
| 38 | 56.799 | 3.29 | | | 31.62 |
| 39 | 43.514 | 3.54 | 1.883 | 40.8 | 35.33 |
| 40 | 96.86 | (variable) | | | 35.24 |
| Image Plane | ∞ | | | | |

Various Data
Zoom ratio 2.68

| | Wide angle end | Intermediate position | Telephoto end |
|---|---|---|---|
| Focal length | 72.14 | 130.58 | 193.38 |
| F-number | 4 | 4 | 4 |
| Angle of view | 16.69 | 9.41 | 6.38 |
| Image height | 21.64 | 21.64 | 21.64 |
| Total lens length | 213.85 | 213.85 | 213.85 |
| BF | 39.96 | 39.96 | 39.96 |
| d6 | 3.97 | 32.75 | 43.98 |
| d13 | 28.89 | 15.38 | 1.07 |
| d16 | 15.74 | 0.48 | 3.56 |
| d24 | 0.81 | 0.81 | 0.81 |
| d29 | 16.61 | 16.61 | 16.61 |
| d31 | 15.28 | 15.28 | 15.28 |
| d36 | 1.44 | 1.44 | 1.44 |
| d40 | 39.96 | 39.96 | 39.96 |
| Entrance pupil position | 60.46 | 130.39 | 166.94 |
| Exit pupil position | −77.06 | −77.06 | −77.06 |
| Front principal point position | 88.13 | 115.26 | 40.77 |
| Rear principal point position | −32.19 | −90.63 | −153.42 |

Zoom Lens Unit Data

| Unit | First surface | Focal length | Lens length | Front principal point position | Rear principal point position |
|---|---|---|---|---|---|
| 1 | 1 | 111.14 | 20.05 | 6.72 | −7.28 |
| 2 | 7 | −32.25 | 14.97 | 4.11 | −6.42 |
| 3 | 14 | 82.21 | 6.3 | 2.65 | −1.04 |
| 4 | 17 | 46.22 | 17.85 | 1.95 | −10.45 |
| 5 | 25 | −50.05 | 9.64 | −1.46 | −8.54 |
| 6 | 30 | −426.64 | 2.5 | 4.32 | 2.88 |
| 7 | 32 | 54.59 | 11.5 | 1.78 | −5.37 |
| 8 | 37 | −78.82 | 8.33 | −1.45 | −7.48 |

Single Lens Data

| Lens | First surface | Focal length |
|---|---|---|
| 1 | 1 | −226.22 |
| 2 | 3 | 135.3 |
| 3 | 5 | 164.75 |
| 4 | 7 | −43.1 |
| 5 | 9 | −58.57 |
| 6 | 10 | 39.96 |
| 7 | 12 | −72.38 |
| 8 | 14 | 34.68 |
| 9 | 15 | −60.21 |
| 10 | 18 | 71.56 |
| 11 | 20 | 70.32 |
| 12 | 22 | −26.3 |
| 13 | 23 | 33.47 |
| 14 | 25 | −37.38 |
| 15 | 27 | −28.38 |
| 16 | 28 | 25.09 |
| 17 | 30 | −426.64 |
| 18 | 32 | 74.89 |
| 19 | 34 | 45.58 |
| 20 | 35 | −56.72 |
| 21 | 37 | −40.29 |
| 22 | 39 | 86.78 |

Third Numerical Example
Unit mm
Surface Data

| Surface No. | r | d | nd | vd | Effective Diameter |
|---|---|---|---|---|---|
| 1 | 101.942 | 2.1 | 1.72047 | 34.7 | 61.45 |
| 2 | 64.514 | 0.46 | | | 59.63 |
| 3 | 67.415 | 8.51 | 1.43387 | 95.1 | 59.63 |
| 4 | 7799.242 | 0.15 | | | 59.23 |
| 5 | 64.986 | 8.2 | 1.43875 | 94.9 | 56.89 |
| 6 | −4511.65 | (variable) | | | 56.04 |
| 7 | 136.575 | 1.2 | 1.804 | 46.6 | 32.4 |
| 8 | 32.132 | 7.99 | | | 29.77 |
| 9 | −67.699 | 1.25 | 1.497 | 81.5 | 28.65 |
| 10 | 38.466 | 4.77 | 1.80518 | 25.4 | 27.95 |
| 11 | −331.876 | 2.89 | | | 27.5 |
| 12 | −49.886 | 1.25 | 1.801 | 35 | 26.73 |
| 13 | −302.862 | (variable) | | | 27.36 |
| 14 | 190.408 | 5.9 | 1.6968 | 55.5 | 28.03 |
| 15 | −28.467 | 1.4 | 1.8348 | 42.7 | 28.12 |
| 16 | −65.753 | (variable) | | | 28.86 |
| 17(stop) | ∞ | 1.4 | | | 28.9 |
| 18 | 63.068 | 3.57 | 1.6727 | 32.1 | 28.93 |
| 19 | −101.907 | 0.2 | | | 28.77 |
| 20 | 41.704 | 3.8 | 1.6968 | 55.5 | 27 |
| 21 | 85.528 | 2.6 | | | 25.53 |
| 22 | −100.149 | 1.6 | 1.80518 | 25.4 | 24.6 |

Third Numerical Example
Unit mm

| | | | | |
|---|---|---|---|---|
| 23 | 26.371 | 5.04 | 1.59282 68.6 | 23.12 |
| 24 | −77.054 | (variable) | | 22.81 |
| 25 | −1700.67 | 1.37 | 1.84666 23.9 | 22.02 |
| 26 | 36.486 | 2.96 | | 21.21 |
| 27 | −67.657 | 2.05 | 1.6223 53.2 | 21.21 |
| 28 | 30.006 | 4.32 | 1.80809 22.8 | 21.83 |
| 29 | −124.655 | (variable) | | 21.89 |
| 30 | ∞ | 3.6 | | 26.64 |
| 31 | −10636.7 | 3 | 1.6223 53.2 | 28.14 |
| 32 | −355.643 | (variable) | | 28.84 |
| 33 | −232.907 | 4.14 | 1.72047 34.7 | 33.52 |
| 34 | −46.764 | 0.5 | | 33.93 |
| 35 | 54.282 | 7.21 | 1.59282 68.6 | 33.38 |
| 36 | −43.153 | 1.5 | 1.883 40.8 | 32.98 |
| 37 | −1721.54 | (variable) | | 32.43 |
| 38 | −110.459 | 1.5 | 1.834 37.2 | 32.03 |
| 39 | 45.45 | 3.29 | | 32 |
| 40 | 43.514 | 3.54 | 1.883 40.8 | 34.85 |
| 41 | 96.86 | (variable) | | 34.73 |
| Image Plane | ∞ | | | |

Various Data
Zoom ratio 2.68

| | Wide angle end | Intermediate position | Telephoto end |
|---|---|---|---|
| Focal length | 72.11 | 132.09 | 193.4 |
| F-number | 4.0 | 4.0 | 4.0 |
| Angle of view | 16.7 | 9.3 | 6.38 |
| Image height | 21.64 | 21.64 | 21.64 |
| Total lens length | 233.51 | 233.51 | 233.51 |
| BF | 49.05 | 49.77 | 50.05 |
| d6 | 2.03 | 30.58 | 41.73 |
| d13 | 26.8 | 14.1 | 1.28 |
| d16 | 18.03 | 1.46 | 2.85 |
| d24 | 0.58 | 0.58 | 0.58 |
| d29 | 18.13 | 18.13 | 18.13 |
| d32 | 12.99 | 12.99 | 12.99 |
| d37 | 2.63 | 2.63 | 2.63 |
| d41 | 49.05 | 49.77 | 50.05 |
| Entrance pupil position | 59.91 | 132.19 | 171.75 |
| Exit pupil position | −85.83 | −85.83 | −85.83 |
| Front principal point position | 93.46 | 135.61 | 89.89 |
| Rear principal point position | −23.05 | −82.31 | −143.34 |

Zoom Lens Unit Data

| Unit | First surface | Focal length | Lens length | Front principal point position | Rear principal point position |
|---|---|---|---|---|---|
| 1 | 1 | 110.72 | 19.43 | 5.62 | −8 |
| 2 | 7 | −31.26 | 19.35 | 5.46 | −8.97 |
| 3 | 14 | 87.58 | 7.3 | 3.25 | −1.04 |
| 4 | 17 | 53.26 | 18.21 | 0.57 | −12.06 |
| 5 | 25 | −52.53 | 10.71 | −1.5 | −9.29 |
| 6 | 30 | 591.2 | 6.6 | 5.51 | 0.06 |
| 7 | 33 | 56.2 | 13.35 | 1.4 | −6.65 |
| 8 | 38 | −72.05 | 8.33 | −1.11 | −7.13 |

Single Lens Data

| Lens | First surface | Focal length |
|---|---|---|
| 1 | 1 | −249.76 |
| 2 | 3 | 156.68 |
| 3 | 5 | 146.09 |

Third Numerical Example
Unit mm

| | | |
|---|---|---|
| 4 | 7 | −52.53 |
| 5 | 9 | −49.16 |
| 6 | 10 | 43.06 |
| 7 | 12 | −74.73 |
| 8 | 14 | 35.94 |
| 9 | 15 | −61.18 |
| 10 | 18 | 58.42 |
| 11 | 20 | 112.79 |
| 12 | 22 | −25.78 |
| 13 | 23 | 33.75 |
| 14 | 25 | −42.17 |
| 15 | 27 | −33.14 |
| 16 | 28 | 30.31 |
| 17 | 31 | 591.2 |
| 18 | 33 | 80.46 |
| 19 | 35 | 41.7 |
| 20 | 36 | −50.15 |
| 21 | 38 | −38.44 |
| 22 | 40 | 86.78 |

Fourth Numerical Example
Unit mm

Surface Data

| Surface No. | r | d | nd | vd | Effective Diameter |
|---|---|---|---|---|---|
| 1 | 1618.788 | 1.8 | 1.85026 | 32.3 | 68.51 |
| 2 | 53.723 | 9 | 1.7495 | 35.3 | 60.45 |
| 3 | 336.311 | 0.15 | | | 59.87 |
| 4 | 62.893 | 8 | 1.51742 | 52.4 | 55.2 |
| 5 | 8285.464 | (variable) | | | 53.67 |
| 6* | 47.754 | 1.3 | 1.72903 | 54 | 36.12 |
| 7 | 15.087 | 11.35 | | | 26.71 |
| 8 | −40.19 | 1 | 1.6968 | 55.5 | 25.56 |
| 9 | 42.175 | 0.15 | | | 24.56 |
| 10 | 31.019 | 6.1 | 1.71736 | 29.5 | 24.62 |
| 11 | −46.487 | 1.5 | | | 24.01 |
| 12 | −27.605 | 1.2 | 1.80809 | 22.8 | 23.51 |
| 13 | −37.805 | (variable) | | | 23.42 |
| 14 | ∞ | 1.5 | | | 16.28 |
| 15 | −181.794 | 2 | 1.43875 | 94.9 | 16.66 |
| 16 | −29.039 | (variable) | | | 16.88 |
| 17(stop) | ∞ | 0.5 | | | 17.01 |
| 18 | −66.842 | 1.35 | 1.84666 | 23.9 | 17 |
| 19 | 28.128 | 0.84 | | | 17.52 |
| 20 | 49.584 | 3 | 1.90366 | 31.3 | 17.77 |
| 21 | −52.34 | 0.15 | | | 18.18 |
| 22 | 25.212 | 2.5 | 1.497 | 81.5 | 18.84 |
| 23 | 113.336 | (variable) | | | 18.72 |
| 24 | −33.255 | 1.23 | 1.64 | 60.1 | 18.67 |
| 25 | 300.546 | 2.13 | | | 19.14 |
| 26 | −65.277 | 1.5 | 1.59282 | 68.6 | 19.55 |
| 27 | 44.277 | 6 | 1.6398 | 34.5 | 20.66 |
| 28 | −28.176 | (variable) | | | 21.45 |
| 29 | ∞ | (variable) | | | 21.12 |
| 30 | 286.846 | 3.6 | 1.497 | 81.5 | 23.03 |
| 31 | −28.198 | 0.07 | | | 23.3 |
| 32 | 54.81 | 5.81 | 1.497 | 81.5 | 23.4 |
| 33 | −25.109 | 1.14 | 2.00069 | 25.5 | 23.19 |
| 34 | −72.291 | (variable) | | | 23.69 |
| 35 | 112.921 | 5.5 | 1.7495 | 35.3 | 23.7 |

Fourth Numerical Example
Unit mm

| | | | | | |
|---|---|---|---|---|---|
| 36 | −28.384 | 1.5 | 1.804 | 46.6 | 23.49 |
| 37 | 31.949 | (variable) | | | 23.13 |
| Image Plane | ∞ | | | | |

Aspherical Surface Data
Sixth surface

K = 0.000000E+00  A4 = 5.812450E−06  A6 = −1.114980E−09
A8 = 1.148370E−12  A10 = 1.237750E−14

Various Data
Zoom ratio 2.04

| | Wide angle end | Intermediate position | Telephoto end |
|---|---|---|---|
| Focal length | 24.7 | 35.15 | 50.48 |
| F-number | 4.12 | 4.12 | 4.12 |
| Angle of view | 41.22 | 31.61 | 23.2 |
| Image height | 21.64 | 21.64 | 21.64 |
| Total lens length | 162.21 | 172.02 | 187.21 |
| BF | 37.48 | 45.52 | 56.09 |
| d5 | 1.21 | 15.76 | 30.36 |
| d13 | 23.07 | 10.29 | 0.31 |
| d16 | 0.48 | 0.48 | 0.48 |
| d23 | 2.24 | 2.24 | 2.24 |
| d28 | 7.79 | 7.79 | 7.79 |
| d29 | 6.06 | 6.06 | 6.06 |
| d34 | 2 | 2 | 2 |
| d37 | 37.48 | 45.52 | 56.09 |
| Entrance pupil position | 33.93 | 50.28 | 68.61 |
| Exit pupil position | −38.76 | −38.76 | −38.76 |
| Front principal point position | 50.63 | 70.77 | 92.22 |
| Rear principal point position | 12.78 | 10.37 | 5.6 |

Zoom Lens Unit Data

| Unit | First surface | Focal length | Lens length | Front principal point position | Rear principal point position |
|---|---|---|---|---|---|
| 1 | 1 | 215.95 | 18.95 | 7.66 | −3.84 |
| 2 | 6 | −29.37 | 22.6 | 0.53 | −19.01 |
| 3 | 14 | 78.46 | 3.5 | 3.15 | 0.26 |
| 4 | 17 | 87.37 | 8.34 | 9.73 | 5 |
| 5 | 24 | −375.96 | 10.86 | −55.95 | −74.66 |
| 6 | 29 | ∞ | 0 | 0 | 0 |
| 7 | 30 | 44.02 | 10.62 | 1.55 | −5.35 |
| 8 | 35 | −50.55 | 7 | 5.37 | 1.25 |

Single Lens Data

| Lens | First surface | Focal length |
|---|---|---|
| 1 | 1 | −65.39 |
| 2 | 2 | 84.16 |
| 3 | 4 | 122.44 |
| 4 | 6 | −30.77 |
| 5 | 8 | −29.39 |
| 6 | 10 | 26.82 |
| 7 | 12 | −133.64 |
| 8 | 15 | 78.46 |
| 9 | 18 | −23.23 |
| 10 | 20 | 28.58 |
| 11 | 22 | 64.63 |
| 12 | 24 | −46.72 |
| 13 | 26 | −44.28 |
| 14 | 27 | 27.81 |
| 15 | 30 | 51.86 |
| 16 | 32 | 35.51 |
| 17 | 33 | −38.91 |

Fourth Numerical Example
Unit mm

| | | |
|---|---|---|
| 18 | 35 | 30.78 |
| 19 | 36 | −18.49 |

Fifth Numerical Example
Unit mm

Surface Data

| Surface No. | r | d | nd | vd | Effective Diameter |
|---|---|---|---|---|---|
| 1 | 6701.597 | 1.8 | 1.85026 | 32.3 | 69.02 |
| 2 | 58.356 | 9 | 1.7495 | 35.3 | 60.86 |
| 3 | 333.062 | 0.15 | | | 59.49 |
| 4 | 54.018 | 8 | 1.51742 | 52.4 | 52.32 |
| 5 | 404.569 | (variable) | | | 50.54 |
| 6* | 52.391 | 1.3 | 1.72903 | 54 | 37.56 |
| 7 | 15.176 | 12.83 | | | 27.46 |
| 8 | −34.144 | 1 | 1.6968 | 55.5 | 26.11 |
| 9 | 44.099 | 0.15 | | | 25.58 |
| 10 | 34.239 | 6.1 | 1.71736 | 29.5 | 25.78 |
| 11 | −37.536 | 1.5 | | | 25.53 |
| 12 | −25.658 | 1.2 | 1.80809 | 22.8 | 25.04 |
| 13 | −35.12 | (variable) | | | 25.18 |
| 14 | ∞ | 1 | | | 20.78 |
| 15 | 143.496 | 3 | 1.43875 | 94.9 | 21.31 |
| 16 | −44.691 | (variable) | | | 21.58 |
| 17(stop) | ∞ | 0.5 | | | 21.79 |
| 18 | 243.24 | 1.35 | 2.00069 | 25.5 | 21.86 |
| 19 | 25.817 | 0.71 | | | 21.86 |
| 20 | 31.104 | 3.96 | 1.72047 | 34.7 | 22.31 |
| 21 | −72.399 | 0.15 | | | 22.55 |
| 22 | 27.381 | 2.5 | 1.497 | 81.5 | 23.26 |
| 23 | 58.874 | (variable) | | | 23.07 |
| 24 | −70.714 | 1.23 | 1.62041 | 60.3 | 22.92 |
| 25 | 310.123 | 1.56 | | | 23.11 |
| 26 | −57.828 | 1.5 | 1.883 | 40.8 | 23.14 |
| 27 | 69.622 | 4.53 | 1.72825 | 28.5 | 24.2 |
| 28 | −35.007 | (variable) | | | 24.62 |
| 29 | 91.609 | 5 | 1.497 | 81.5 | 25.47 |
| 30 | −32.703 | 0.5 | | | 25.38 |
| 31 | 55.515 | 5.8 | 1.59282 | 68.6 | 23.16 |
| 32 | −27.961 | 1.14 | 1.80518 | 25.4 | 22.86 |
| 33 | −1453.64 | (variable) | | | 22.79 |
| 34 | 66.8 | 5.38 | 1.76182 | 26.5 | 22.68 |
| 35 | −22.815 | 1.5 | 1.834 | 37.2 | 22.42 |
| 36* | 25.96 | (variable) | | | 21.6 |
| Image Plane | ∞ | | | | |

Aspherical Surface Data
Sixth surface

K = 0  A4 = 7.59711E−06  A6 = −5.83894E−10
A8 = 1.29909E−12  A10 = 1.54230E−14

Thirty-sixth surface

K = 0  A4 = 1.43261E−06  A6 = −2.41409E−08
A8 = 2.48719E−10  A10 = −1.00577E−12

Various Data
Zoom ratio 2.43

| | Wide angle end | Intermediate position | Telephoto end |
|---|---|---|---|
| Focal length | 24.7 | 39.95 | 60.07 |
| F-number | 4.12 | 4.12 | 4.12 |
| Angle of view | 41.22 | 28.44 | 19.81 |
| Image height | 21.64 | 21.64 | 21.64 |
| Total lens length | 173.65 | 183.45 | 198.65 |
| BF | 38.28 | 48.44 | 62.68 |
| d5 | 1.21 | 18.54 | 31.16 |

-continued

Fifth Numerical Example
Unit mm

| | | | |
|---|---|---|---|
| d13 | 30.35 | 10.99 | 0.46 |
| d16 | 0.5 | 2.19 | 0.98 |
| d23 | 3.35 | 4.02 | 4.06 |
| d28 | 14.34 | 12.17 | 11.52 |
| d33 | 1.28 | 2.78 | 3.45 |
| d36 | 38.28 | 48.44 | 62.68 |
| Entrance pupil position | 34.81 | 55.2 | 70.97 |
| Exit pupil position | −34.42 | −32.99 | −32.43 |
| Front principal point position | 51.12 | 75.55 | 93.1 |
| Rear principal point position | 13.58 | 8.49 | 2.61 |

Zoom Lens Unit Data

| Unit | First surface | Focal length | Lens length | Front principal point position | Rear principal point position |
|---|---|---|---|---|---|
| 1 | 1 | 220.13 | 18.95 | 6.65 | −4.81 |
| 2 | 6 | −27.57 | 24.08 | 0.62 | −20.7 |
| 3 | 14 | 78.05 | 4 | 2.6 | −0.5 |
| 4 | 17 | 100.35 | 9.17 | 7.29 | 1.58 |
| 5 | 24 | 183.83 | 8.82 | −14.42 | −22.04 |
| 6 | 29 | 40.55 | 12.44 | 1.69 | −6.3 |
| 7 | 34 | −44.57 | 6.88 | 5.98 | 1.86 |

Single Lens Data

| Lens | First surface | Focal length |
|---|---|---|
| 1 | 1 | −69.24 |
| 2 | 2 | 93.09 |
| 3 | 4 | 119.56 |
| 4 | 6 | −29.74 |
| 5 | 8 | −27.47 |
| 6 | 10 | 25.88 |
| 7 | 12 | −124.94 |
| 8 | 15 | 78.05 |
| 9 | 18 | −28.95 |
| 10 | 20 | 30.69 |
| 11 | 22 | 100.34 |
| 12 | 24 | −92.7 |
| 13 | 26 | −35.58 |
| 14 | 27 | 32.58 |
| 15 | 29 | 49.15 |
| 16 | 31 | 32.2 |
| 17 | 32 | −35.42 |
| 18 | 34 | 22.92 |
| 19 | 35 | −14.36 |

TABLE 1

Relationship between Numerical Example and Conditional Expression

| Conditional Expression | Numerical Example | | | | |
|---|---|---|---|---|---|
| | 1 | 2 | 3 | 4 | 5 |
| (1) | −2.77 | −5.41 | −4.37 | −0.2 | −0.219 |
| (2) | 2.95 | 2.23 | 2.95 | 4.29 | 5.59 |
| (3) | 0.151 | 0.118 | 0.144 | 0.123 | 0.092 |
| (4) | 0.119 | 0.112 | 0.103 | 0.100 | 0.085 |
| (5) | 1.3 | 1.0 | 1.4 | 1.2 | 1.1 |
| (6) | 0.85 | 0.78 | 0.88 | 0.70 | 0.53 |
| (7) | 0.23 | 0.06 | 0.15 | 0.27 | 0.12 |

The zoom lens of the present invention includes the front lens group including a plurality of lens units that move for zooming, the aperture stop, and the rear lens group including a plurality of lens units that move for focusing. The rear lens group includes the lens unit N that has a negative refractive power and moves to the image side for focusing from infinity to the closest distance, and the lens unit P that has a positive refractive power and moves to the object side for focusing.

In the first to third embodiments of the zoom lens of the present invention, the following Conditional Expressions (8) and (9) are further satisfied:

$$0.3 < |fRN/fR| < 0.8 \quad (8)$$

$$0.3 < |fRP/fR| < 0.8 \quad (9)$$

where fR represents the focal length of the rear lens group provided when focus is at infinity at the wide angle end, and fRN and fRP respectively represent the focal lengths of the lens units N and P.

Conditional Expressions (8) and (9) relate to the refractive powers of the focus lens units, the maximum photographic magnification, and the optical performance during focusing. When the refractive powers of the focus lens units are small such that the upper limits of Conditional Expressions (8) and (9) are exceeded, for example, the moving amounts of the lens units need to be large in order to ensure the maximum photographic magnification of about 0.5, and this increases the size of the entire system. In contrast, when the refractive powers of the focus lens units are large such that the lower limits of Conditional Expressions (8) and (9) are exceeded, it is difficult to correct aberration variations due to focusing.

While two lens units move for focusing in the first to third embodiments, two or more lens units may be moved to further reduce aberration variations in focusing. In the first to third embodiments, the values in Conditional Expressions (8) and (9) are more preferably set to be within the following numerical ranges:

$$0.40 < |fRN/fR| < 0.60 \quad (8a)$$

$$0.40 < |fRP/fR| < 0.60 \quad (9a).$$

Table 2 shows the relationships between Conditional Expressions (8) and (9) and the first to third numerical examples.

TABLE 2

| | First numerical Example | Second numerical Example | Third numerical Example |
|---|---|---|---|
| Conditional Expression (8) | 0.48 | 0.43 | 0.47 |
| Conditional Expression (9) | 0.47 | 0.47 | 0.50 |

Next, an embodiment of a single-lens reflex camera system (image pickup apparatus) using the zoom lens of the present invention will be described with reference to FIG. 22. Referring to FIG. 22, the single-lens reflex camera system includes a single-lens reflex camera body 10 and an interchangeable lens 11 in which a zoom lens according to any embodiment described in the present invention is mounted. The single-lens reflex camera body 10 includes a recording member 12, such as a film or an image pickup element (CCD or CMOS sensor), that records (receives) an object image formed via the interchangeable lens 11, a viewfinder optical system 13 through which the object image from the interchangeable lens 11 is observed, and a quick return mirror 14 that turns to transfer the object image from the interchangeable lens 11 while switching between the recording unit 12 and the viewfinder optical system 13.

To observe an object image through a viewfinder, the object image formed on a focusing plate 15 via the quick return mirror 14 is turned into an erected image by a pentaprism 16, and is then enlarged and observed through an eyepiece optical system 17. For photographing, the quick return mirror 14 turns in a direction of arrow and an object image is recorded on the recording member 12. The single-lens reflex camera body 10 further includes a sub-mirror 18 and a focus detection unit 19. By thus applying the zoom lens of the present invention to the image pickup apparatus such as the single-lens reflex camera interchangeable lens, the image pickup apparatus can have high optical performance.

The present invention is similarly applicable to a mirrorless single-lens reflex camera including no quick return mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-250498 filed Nov. 16, 2011 and No. 2011-251498 filed Nov. 17, 2011, which are hereby incorporated by reference herein in their entirety.

What is claimed is:

1. A zoom lens comprising in order from object side to image side:
   a front lens group including a plurality of lens units configured to move for zooming;
   an aperture stop; and
   a rear lens group including a plurality of lens units configured to move for focusing,
   wherein the rear lens group includes a negative lens unit having a negative refractive power and a positive lens unit having a positive refractive power arranged in order from the object side to the image side, and
   wherein, for focusing from infinity to a closest distance, the negative lens unit included in the rear lens group moves towards the image side, and the positive lens unit included in the rear lens group moves towards the object side.

2. The zoom lens according to claim 1, wherein the following conditional expressions are satisfied:

$$-10.0 < F_N < 0.0$$

$$2.0 < F_P < 10.0$$

where $F_N$ and $F_P$ respectively represent focus sensitivities of the negative lens unit and the positive lens unit when focusing at infinity with the zoom lens at a telephoto end.

3. The zoom lens according to claim 1, wherein the following conditional expressions are satisfied:

$$0.08 < |dfN/fR| < 0.30$$

$$0.08 < |dfP/fR| < 0.30$$

where dfN and dfP represent moving amounts of the negative lens unit and the positive lens unit during focusing from infinity to the closest distance at a telephoto end, and fR represents a focal length of the rear lens group when focusing at infinity with the zoom lens at a wide angle end.

4. The zoom lens according to claim 1, wherein the following conditional expression is satisfied:

$$0.8 < |dfN/dfP| < 1.5$$

where dfN and dfP represent moving amounts of the negative lens unit and the positive lens unit during focusing from infinity to the closest distance at a telephoto end.

5. The zoom lens according to claim 1, wherein the following conditional expression is satisfied:

$$0.2 < |\beta_{Rtinf} - \beta_{Rtmod}| < 1.0$$

where $\beta_{Rtinf}$ and $\beta_{Rtmod}$ respectively represent lateral magnifications of the rear lens group when focusing at infinity and at the closest distance at a telephoto end.

6. The zoom lens according to claim 1, wherein the following conditional expression is satisfied:

$$|O1R/fR| < 0.5$$

where O1R represents a distance from an object-side lens surface of the rear lens group to a front-side principal point position of the rear lens group when focusing at infinity at a wide angle end, and fR represents a focal length of the rear lens group when focusing at infinity at the wide angle end.

7. The zoom lens according to claim 1,
wherein the zoom lens includes, in order from the object side to the image side, a first lens unit having a positive refractive power, a second lens unit having a negative refractive power, a third lens unit having a positive refractive power, a fourth lens unit having a positive refractive power, a fifth lens unit having a negative refractive power, a sixth lens unit having a positive refractive power, and a seventh lens unit having a negative refractive power, and
wherein, for zooming from a wide angle end to a telephoto end, the second lens unit moves to the image side and the third lens unit moves along a locus convex towards the image side, and
wherein, for focusing from infinity to the closest distance, the fifth lens unit moves towards the image side and the sixth lens unit moves towards the object side.

8. The zoom lens according to claim 1,
wherein the zoom lens includes, in order from the object side to the image side, a first lens unit having a positive refractive power, a second lens unit having a negative refractive power, a third lens unit having a positive refractive power, a fourth lens unit having a positive refractive power, a fifth lens unit having a negative refractive power, a sixth lens unit having a positive refractive power, and a seventh lens unit having a negative refractive power,
wherein, for zooming from a wide angle end to a telephoto end, the first lens unit moves to the object side, the second lens unit moves along a locus convex towards the image side, the third lens unit moves to the object side, and the fourth to seventh lens units move together to the object side, and
wherein, for focusing from infinity to the closest distance, the fifth lens unit moves towards the image side, and the sixth lens unit moves towards the object side.

9. The zoom lens according to claim 1,
wherein the zoom lens includes, in order from the object side to the image side, a first lens unit having a positive refractive power, a second lens unit having a negative refractive power, a third lens unit having a positive refractive power, a fourth lens unit having a positive refractive power, a fifth lens unit having a negative refractive power, a sixth lens unit having a positive refractive power, and a seventh lens unit having a negative refractive power,
wherein, for zooming from a wide angle end to a telephoto end, the first lens unit and the third to seventh lens units move towards the object side along different loci, and the second lens unit moves along a locus convex towards the image side, and wherein, for focusing from infinity to the closest distance, the fifth lens unit moves towards the image side, and the sixth lens unit moves towards the object side.

10. The zoom lens according to claim 1, wherein the following conditional expressions are satisfied:

$$0.3<|fRN/fR|<0.8$$

$$0.3<|fRP/fR|<0.8$$

where fR represents a focal length of the rear lens group when focusing at infinity at a wide angle end, and fRN and fRP represent focal lengths of the negative lens unit and the positive lens unit.

11. The zoom lens according to claim 1, wherein the zoom lens includes, in order from the object side to the image side, a first lens unit having a positive refractive power, a second lens unit having a negative refractive power, a third lens unit having a positive refractive power, a fourth lens unit having a positive refractive power, a fifth lens unit having a negative refractive power, a sixth lens unit having a positive refractive power, a seventh lens unit having a positive refractive power, and an eighth lens unit having a negative refractive power, wherein, for zooming from a wide angle end to a telephoto end, the second lens unit moves to the image side and the third lens unit moves along a locus convex towards the image side, and wherein, for focusing from infinity to the closest distance, the fifth lens unit moves towards the image side and the seventh lens unit moves towards the object side.

12. The zoom lens according to claim 11, wherein the fourth to eighth lens units move together to the object side for zooming from the wide angle end to the telephoto end.

13. An image pickup apparatus comprising:

a zoom lens; and a solid-state image pickup element configured to receive an optical image formed by the zoom lens, the zoom lens comprising in order from object side to image side:

a front lens group including a plurality of lens units configured to move for zooming;

an aperture stop; and a rear lens group including a plurality of lens units configured to move for focusing, wherein the rear lens group includes a negative lens unit having a negative refractive power and a positive lens unit having a positive refractive power arranged in order from the object side to the image side, and wherein, for focusing from infinity to a closest distance, the negative lens unit included in the rear lens group moves towards the image side, and the positive lens unit included in the rear lens group moves towards the object side.

14. A zoom lens comprising:

a negative lens unit and a positive lens unit arranged in order from an object side to an image side, wherein the negative lens unit has a negative refractive power and the positive lens unit has a positive refractive power, wherein, for focusing from infinity to a closest distance, the negative lens unit moves towards the image side and the positive lens unit moves towards the object side, and wherein the following conditional expressions are satisfied:

$$-10.0<F_N<0.0$$

$$2.0<F_P<10.0$$

where $F_N$ and $F_P$ respectively represent focus sensitivities of the negative lens unit and the positive lens unit when focusing at infinity with the zoom lens at a telephoto end.

15. An image pickup apparatus comprising:

a zoom lens; and a solid-state image pickup element configured to receive an optical image formed by the zoom lens, the zoom lens comprising:

a negative lens unit and a positive lens unit arranged in order from an object side to an image side, wherein the negative lens unit has a negative refractive power and the positive lens unit has a positive refractive power, wherein, for focusing from infinity to a closest distance, the negative lens unit moves towards the image side and the positive lens unit moves towards the object side, and wherein the following conditional expressions are satisfied:

$$-10.0<F_N<0.0$$

$$2.0<F_P<10.0$$

where $F_N$ and $F_P$ respectively represent focus sensitivities of the negative lens unit and the positive lens unit when focusing at infinity with the zoom lens at a telephoto end.

\* \* \* \* \*